US012160615B2

(12) United States Patent
Xu et al.

(10) Patent No.: US 12,160,615 B2
(45) Date of Patent: Dec. 3, 2024

(54) DECODING BASED ON STRING COPY

(71) Applicant: TENCENT AMERICA LLC, Palo Alto, CA (US)

(72) Inventors: Xiaozhong Xu, State College, PA (US); Shan Liu, San Jose, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

(21) Appl. No.: 18/070,065

(22) Filed: Nov. 28, 2022

(65) Prior Publication Data
US 2023/0087298 A1 Mar. 23, 2023

Related U.S. Application Data

(63) Continuation of application No. 17/203,189, filed on Mar. 16, 2021, now Pat. No. 11,595,694.
(Continued)

(51) Int. Cl.
*H04N 19/70* (2014.01)
*H04N 19/105* (2014.01)
(Continued)

(52) U.S. Cl.
CPC ........... *H04N 19/70* (2014.11); *H04N 19/105* (2014.11); *H04N 19/132* (2014.11);
(Continued)

(58) Field of Classification Search
CPC .. H04N 19/176; H04N 19/186; H04N 19/159; H04N 19/70; H04N 19/132;
(Continued)

(56) References Cited

U.S. PATENT DOCUMENTS

2003/0215094 A1 11/2003 Sato et al.
2014/0104084 A1 4/2014 Cohen
(Continued)

OTHER PUBLICATIONS

Bross et al., "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K1001-v7, 140 pages.
(Continued)

*Primary Examiner* — Neil R Mikeska
(74) *Attorney, Agent, or Firm* — ArentFox Schiff LLP

(57) ABSTRACT

Aspects of the disclosure provide a method and an apparatus including processing circuitry for video decoding. The processing circuitry decodes coding information for a current block. The coding information indicates that the current block is coded in a string copy mode and the coding information includes a first syntax element indicating a string length of a current string in the current block. A coded value of the first syntax element indicates a number N3 of sample groups. Each sample group has L samples, N3 and L being positive numbers. The string length and a number M1 of samples in the current block are divisible by L. The processing circuitry determines a string vector (SV) and the string length of the current string in the current block based on the coding information. The processing circuitry reconstructs the current string based on the SV and the string length of the current string.

18 Claims, 21 Drawing Sheets

Related U.S. Application Data

(60) Provisional application No. 63/003,665, filed on Apr. 1, 2020.

(51) Int. Cl.
*H04N 19/132* (2014.01)
*H04N 19/137* (2014.01)
*H04N 19/159* (2014.01)
*H04N 19/176* (2014.01)
*H04N 19/186* (2014.01)
*H04N 19/44* (2014.01)
*H04N 19/85* (2014.01)

(52) U.S. Cl.
CPC ......... *H04N 19/137* (2014.11); *H04N 19/159* (2014.11); *H04N 19/176* (2014.11); *H04N 19/186* (2014.11); *H04N 19/44* (2014.11); *H04N 19/85* (2014.11)

(58) Field of Classification Search
CPC .... H04N 19/85; H04N 19/105; H04N 19/137; H04N 19/44
See application file for complete search history.

(56) References Cited

U.S. PATENT DOCUMENTS

| | | |
|---|---|---|
| 2015/0264348 A1 | 9/2015 | Zou et al. |
| 2015/0381994 A1 | 12/2015 | Yu et al. |
| 2016/0330455 A1 | 11/2016 | Lin et al. |
| 2016/0373756 A1 | 12/2016 | Yu et al. |
| 2017/0054988 A1 | 2/2017 | Lin et al. |
| 2017/0238001 A1 | 8/2017 | Li et al. |
| 2017/0295376 A1 | 10/2017 | Lee et al. |
| 2018/0167623 A1 | 6/2018 | Lin et al. |
| 2018/0242023 A1 | 8/2018 | Lin et al. |
| 2019/0110079 A1 | 4/2019 | Lin et al. |
| 2020/0112729 A1 | 4/2020 | Lee et al. |

OTHER PUBLICATIONS

International Search Report and Written Opinion in PCT/US2021/025219, mailed Aug. 11, 2021, 10 pages.

Joshi et al., "High Efficiency Video Coding (HEVC) Screen Content Coding: Draft 4," Joint Collaborative Team on Video Coding (JCT-VC) of ITU-T SG 16 WP 3 and ISO/IEC JTC 1/SC 29/WG 11, 21st Meeting: Warsaw, PL, Jun. 19-26, 2015, Document: JCTVC-U1005_r1, 663 pages.

Liu et al., "Overview of HEVC extensions on screen content coding," APSIPA Transactions on Signal and Information Processing, Sep. 2015, vol. 4, 12 pages.

Xu et al., "Intra Block Copy in HEVC Screen Content Coding Extensions," IEEE Journal on Emerging and Selected Topics in Circuits and Systems, Dec. 2016, vol. 6, Issue 4, 11 pages.

Xu et al., "Intra Block Copy in Versatile Video Coding with Reference Sample Memory Reuse," Picture Coding Symposium, Nov. 12-15, 2019, 5 pages.

DECODING BASED ON STRING COPY

INCORPORATION BY REFERENCE

This is a continuation application of U.S. application Ser. No. 17/203,189, filed on Mar. 16, 2021, which claims the benefit of priority to U.S. Provisional Application No. 63/003,665, "HISTORY BASED VECTOR PREDICTION FOR INTRA PICTURE BLOCK AND STRING COPY-ING" filed on Apr. 1, 2020. The entire disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry can be configured to decode coding information for a current block of a current picture. The coding information can indicate a coding mode for the current block being one of: an intra block copy (IBC) mode and a string copy mode. The processing circuitry can be configured to determine current vector information for a current unit of samples in the current block based on the coding mode for the current block and a history buffer. The history buffer can be configured to store vector information of at least a block previously decoded in the IBC mode and a string previously decoded in the string copy mode. The processing circuitry can be configured to reconstruct the current unit of samples based on the current vector information.

In an embodiment, the coding mode for the current block is the IBC mode. The current unit of samples is the current block. The processing circuitry can be configured to determine a BV predictor candidate list for the current block based at least on the vector information in the history buffer and determine, based on the BV predictor candidate list, a current BV in the current vector information.

In an embodiment, the coding mode for the current block is the string copy mode. The current unit of samples is a current string in the current block. The processing circuitry can be configured to determine a current SV in the current vector information from the vector information in the history buffer. The current SV is for the current string.

In an embodiment, the processing circuitry can be configured to store the current vector information into the history buffer if the current vector information is different from one or more of the vector information in the history buffer. In an example, the processing circuitry is configured to determine that the current vector information is different from the one or more of the vector information in the history buffer when a difference between a current vector in the current vector information and each previous vector of the one or more of the vector information in the history buffer is larger than a pre-determined threshold.

In an example, the processing circuitry can be configured to determine that the current vector information is different from the one or more of the vector information in the history buffer based on a size difference between a current unit size of the current vector information and a previous unit size of each of the one or more of vector information being larger than a pre-determined size threshold. The current unit size of the current vector information can indicate a number of samples in the current unit. The vector information in the history buffer can be used to decode previous units of samples that include the block previously decoded in the IBC mode and the string previously decoded in the string copy mode. The previous unit size can indicate a number of samples in the respective previous unit. In an example, based on a difference between the current vector and a previous vector of one of the one or more of the vector information not being larger than a pre-determined threshold, the processing circuitry is configured to remove the one of the one or more of the vector information from the history buffer.

In an embodiment, the one or more of the vector information includes (i) a subset of the vector information in the history buffer or (ii) the vector information in the history buffer.

In an embodiment, one of the vector information in the history buffer includes a string vector and one of (i) a string location and (ii) a string size of the string previously decoded in the string copy mode. The string location is a location of a pre-determined sample in the string previously decoded in the string copy mode. The string size is a number of samples in the string previously decoded in the string copy mode.

In an embodiment, the vector information in the history buffer includes previous vectors and previous unit sizes, and previous unit locations of corresponding previously decoded unit of samples that include the block previously decoded in the IBC mode and the string previously decoded in the string copy mode. The processing circuitry can be configured to classify each of the vector information stored in the history buffer into one of a plurality of categories based on at least one of: (i) the previous unit size of the respective vector information, (ii) the previous unit location of the respective vector information, or (iii) a number of times that the respective vector information is used to predict one or more previously decoded units of samples. The history buffer can be a class-based history buffer. In an example, the coding information for the current block further includes an index. The processing circuitry can be configured to determine the current vector information to be a first entry in one of the plurality of categories indicated by the index.

According to aspects of the disclosure, the processing circuitry can be configured to decode coding information for a current block. The coding information can indicate that the current block is coded in a string copy mode. The processing circuitry can be configured to determine a string vector (SV) and a string length of a current string in the current block based on the coding information. The string length can be N3 times L where N3 and L are positive integers, and L is larger than 1. The processing circuitry can be configured to reconstruct the current string based on the SV and the string length of the current string.

In an example, the current block is a luma block and L is 4.

In an example, the current block is a chroma block. A chroma subsampling format is 4:2:0 indicating that the chroma block has half a height and half a width of a corresponding luma block. L is 2 based on the chroma block being coded jointly with the corresponding luma block, and L is 4 based on the chroma block being coded separately from the corresponding luma block.

In an example, the current block includes one or more strings that has the current string. The current block further includes escape samples outside of the one or more strings. A number of the escape samples is one or a multiple of L. In an example, a number of escape samples in a same row of the current block is one or a multiple of L.

In an embodiment, the coding information further includes a syntax element indicating the string length. A coded value of the syntax element is the string length divided by L. The coded value of the syntax element is an integer in a range from 1 to (M1/L−1) where M1 is a number of samples in the current block. In an example, the processing circuitry is configured to decode the syntax element and further determine the string length to be the coded value of the syntax element multiplied by L.

In an embodiment, the processing circuitry is configured to decode a syntax element that indicates a resolution used for the SV. In an example, the syntax element has 1 bit indicating that the resolution for the SV is one of (i) 1-sample and (ii) 4-sample. Based on the resolution for the SV being 4-sample, the processing circuitry is configured to determine an intermediate SV from the coding information and determine the SV to be the intermediate SV multiplied by 4.

In an example, the current block includes a plurality of strings that has the current string and a last string length of a last string that is to be coded in the plurality of strings is not signaled. In an example, the last string length is determined based on (i) a number of samples in the current block and (ii) one or more string lengths of one or more remaining strings in the plurality of strings. In an example, the coding information includes a flag indicating whether the current string is the last string.

Aspects of the disclosure also provide a non-transitory computer-readable medium storing instructions which when executed by a computer for video encoding/decoding cause the computer to perform any of the methods for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 3:
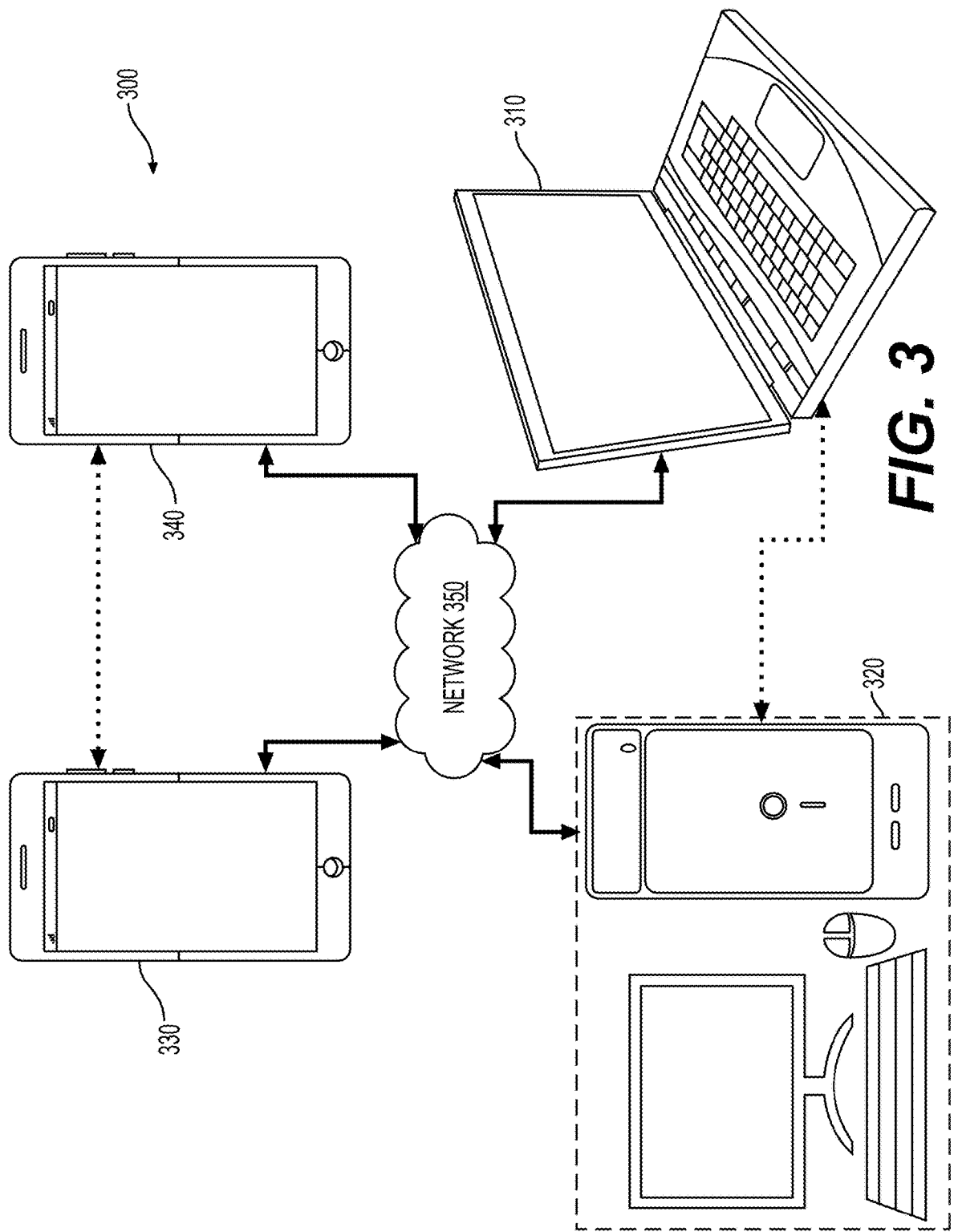
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
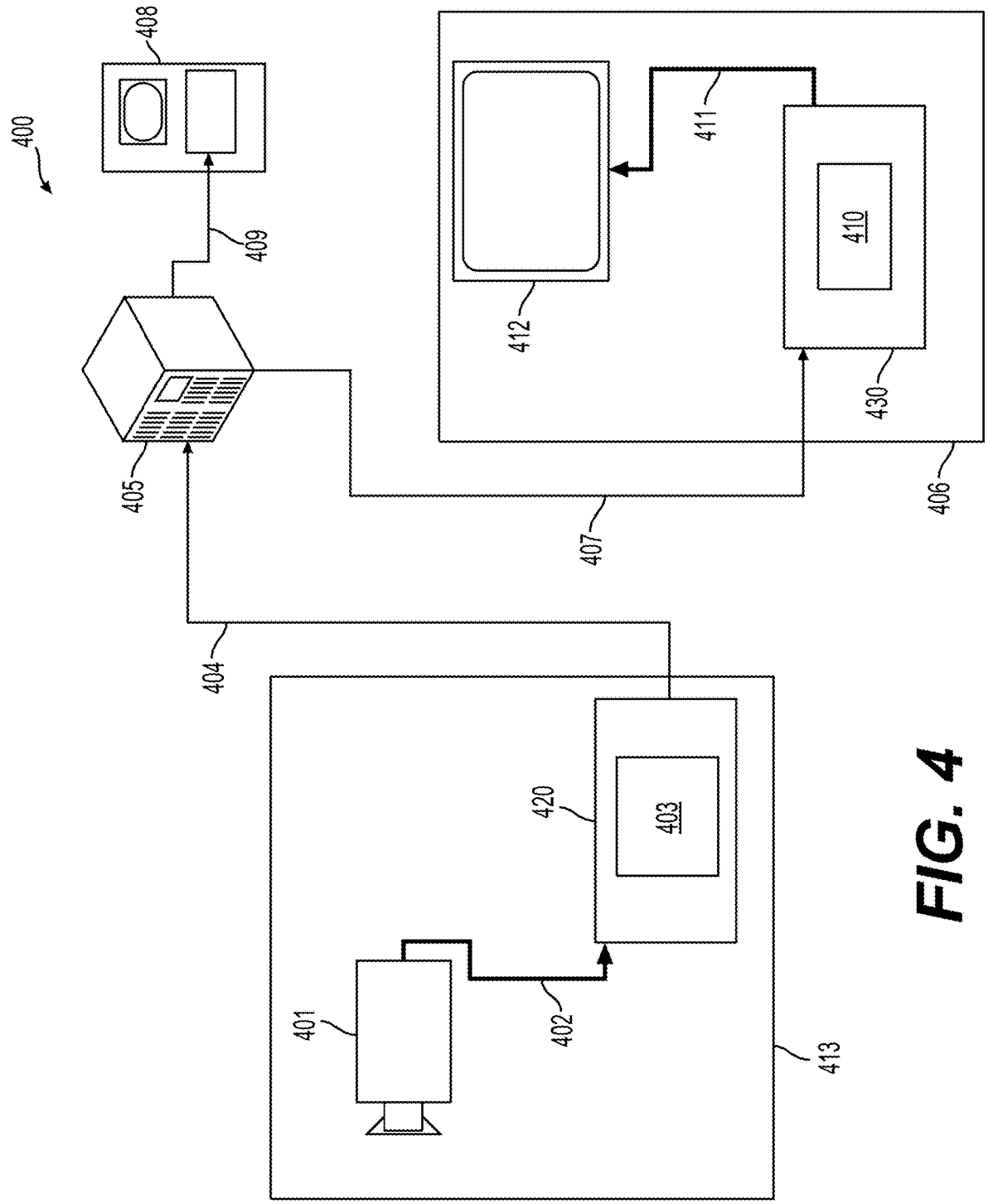
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
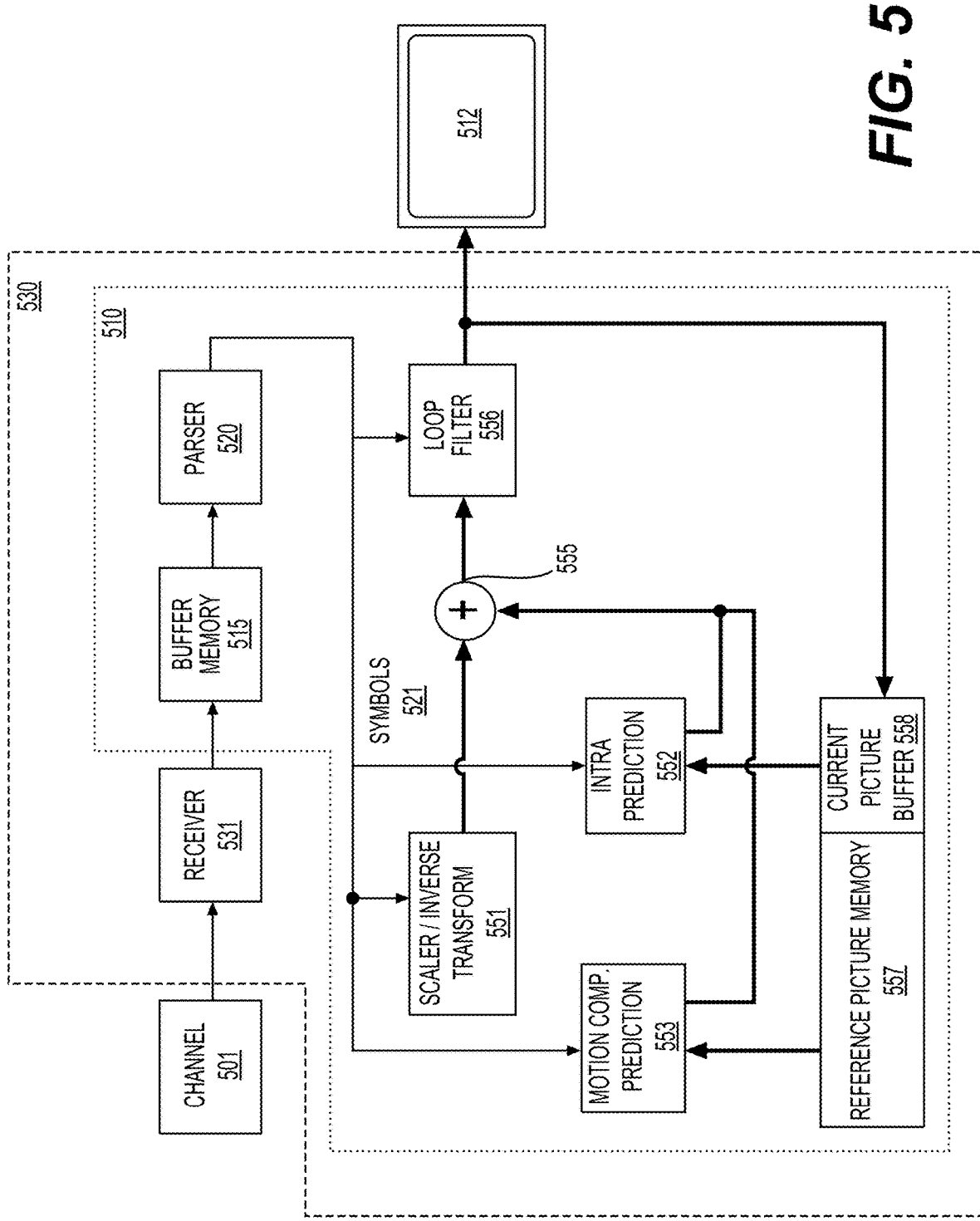
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
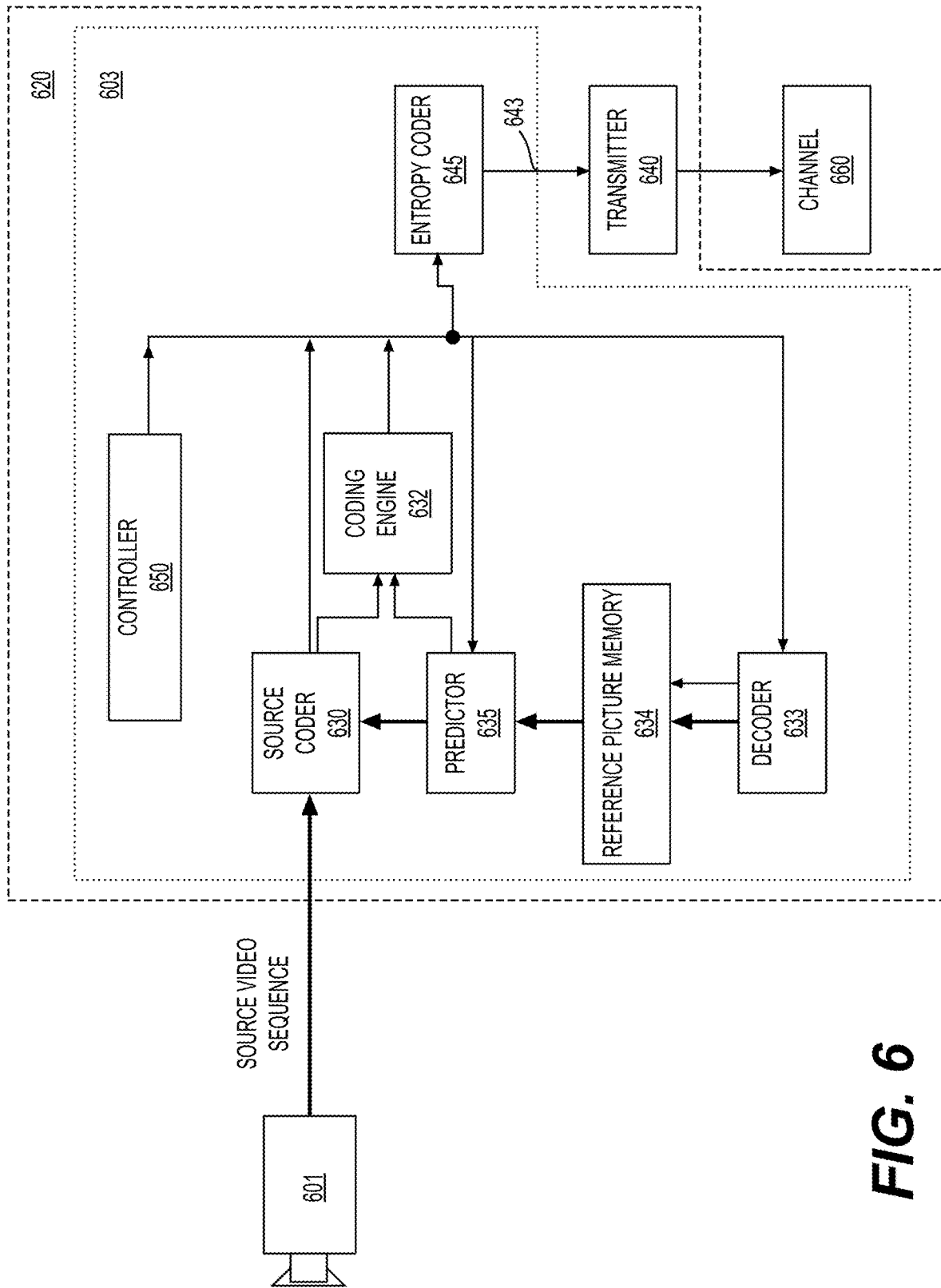
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any color space (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by losslessly compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
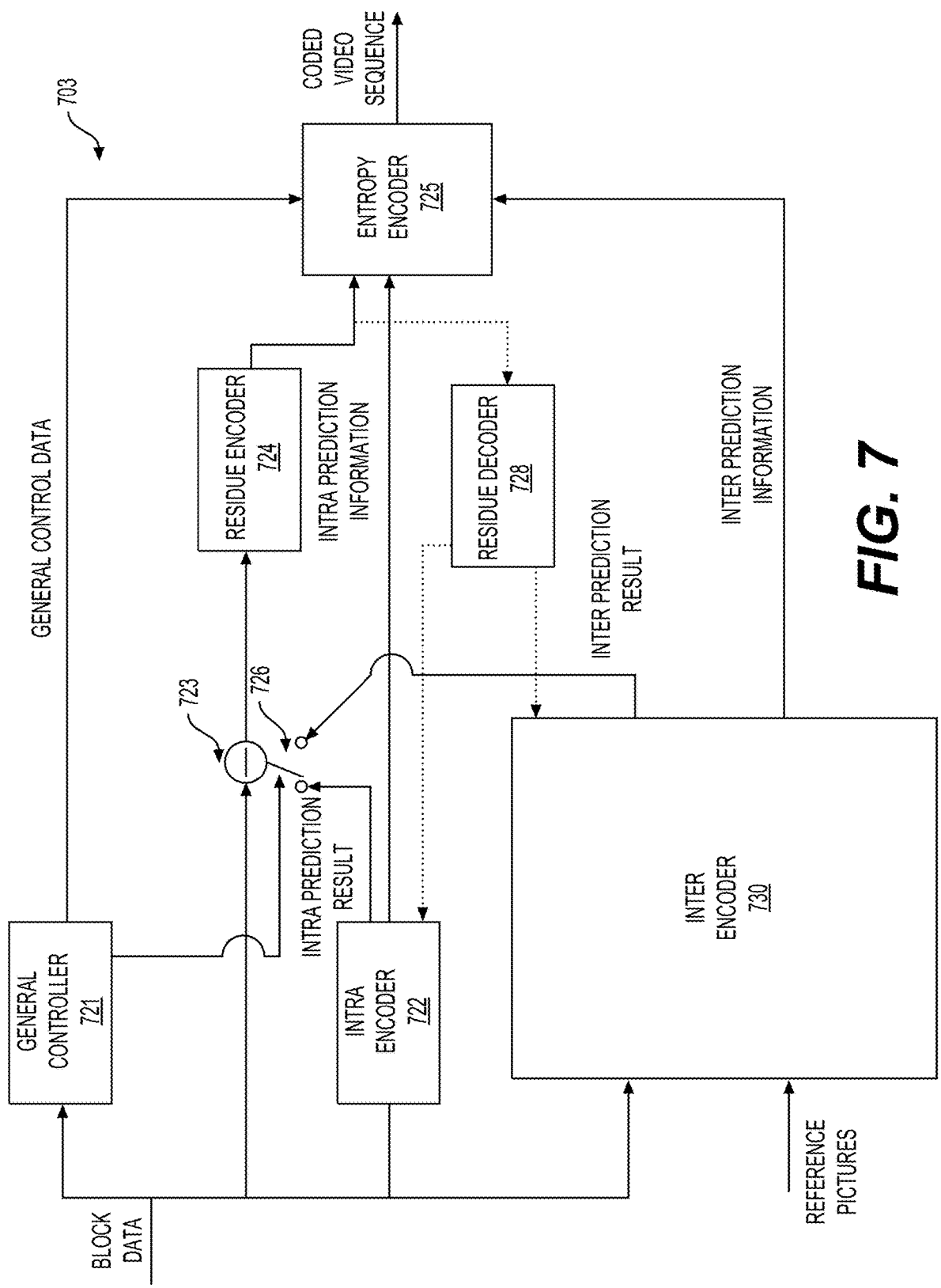
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
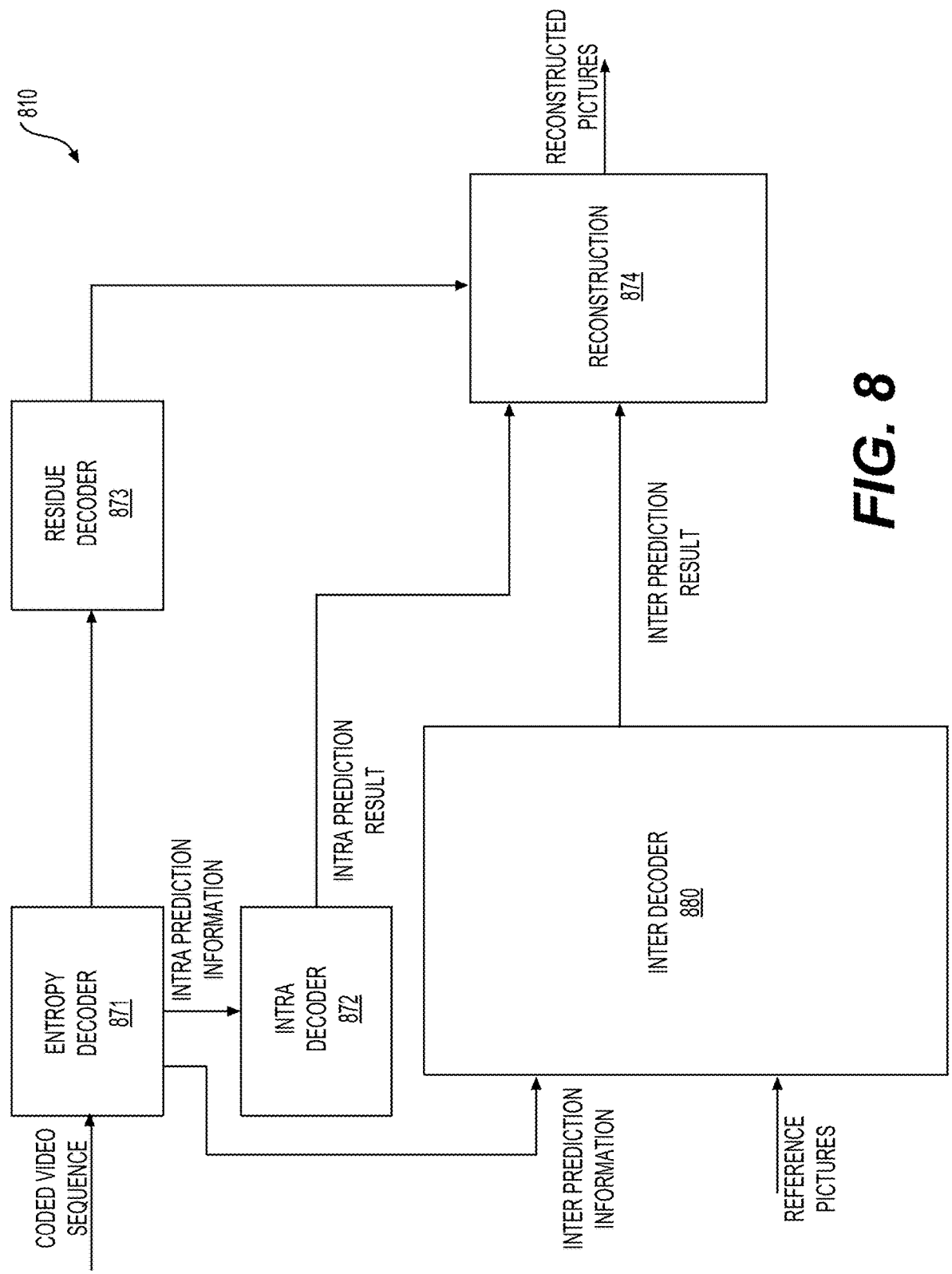
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Aspects of the disclosure provide techniques for history-based vector prediction for an intra picture block, a string using a string copying mode, or the like.

Block based compensation can be used for inter prediction and intra prediction. For the inter prediction, block based compensation from a different picture is known as motion compensation. Block based compensation can also be done from a previously reconstructed area within the same picture, such as in intra prediction. The block based compensation from reconstructed area within the same picture is referred to as intra picture block compensation, current picture referencing (CPR), or intra block copy (IBC). A displacement vector that indicates an offset between a current block and a reference block (also referred to as a prediction block) in the same picture is referred to as a block vector (BV) where the current block can be encoded/decoded based on the reference block. Different from a motion vector in motion compensation, which can be at any value (positive or negative, at either x or y direction), a BV has a few constraints to ensure that the reference block is available and already reconstructed. Also, in some examples, for parallel processing consideration, some reference area that is tile boundary, slice boundary, or wavefront ladder shape boundary is excluded.

The coding of a block vector could be either explicit or implicit. In the explicit mode, a BV difference between a block vector and its predictor is signaled. In the implicit mode, the block vector is recovered from a predictor (referred to as block vector predictor) without using the BV difference, in a similar way as a motion vector in the merge mode. The explicit mode can be referred to as a non-merge BV prediction mode. The implicit mode can be referred to as a merge BV prediction mode.

The resolution of a block vector, in some implementations, is restricted to integer positions. In other systems, the block vector is allowed to point to fractional positions.

In some examples, the use of intra block copy at a block level can be signaled using a block level flag, such as an IBC flag. In an embodiment, the block level flag is signaled when the current block is coded explicitly. In some examples, the use of intra block copy at a block level can be signaled using a reference index approach. The current picture under decoding is then treated as a reference picture or a special reference picture. In an example, such a reference picture is put in the last position of a list of reference pictures. The special reference picture is also managed together with other temporal reference pictures in a buffer, such as a decoded picture buffer (DPB).

Figure 1A:
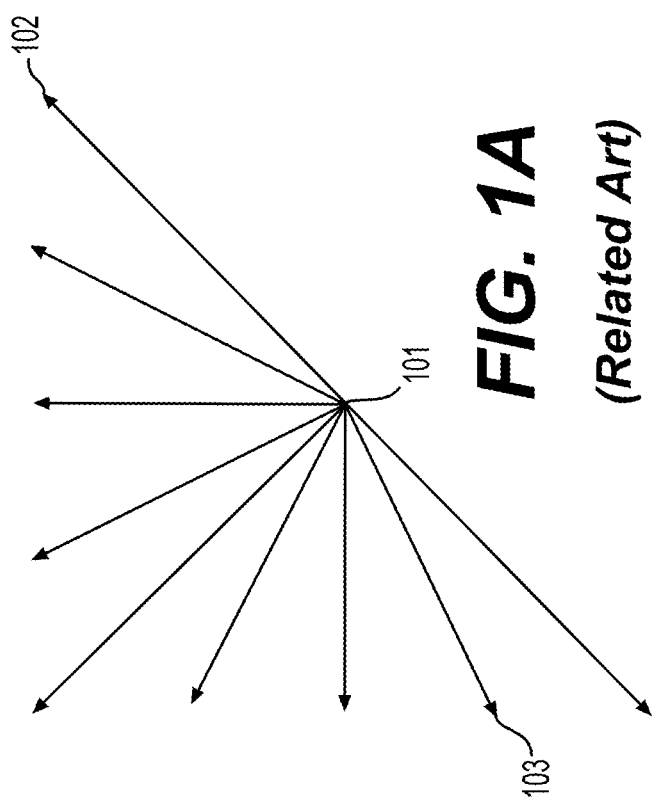
FIG. 1A is a schematic illustration of an exemplary subset of intra prediction modes.
Figure 1B:
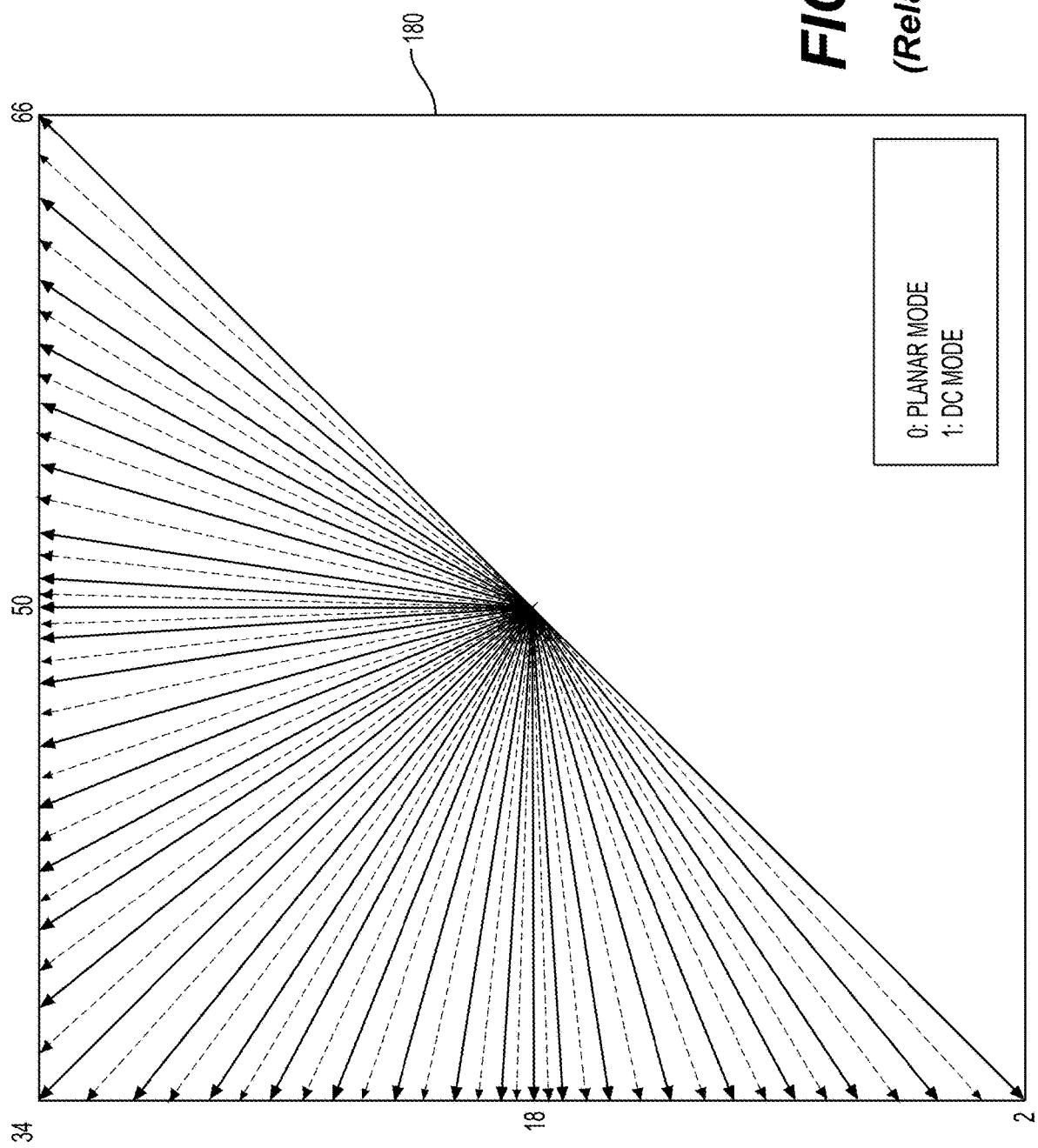
FIG. 1B is an illustration of exemplary intra prediction directions.
Figure 2:
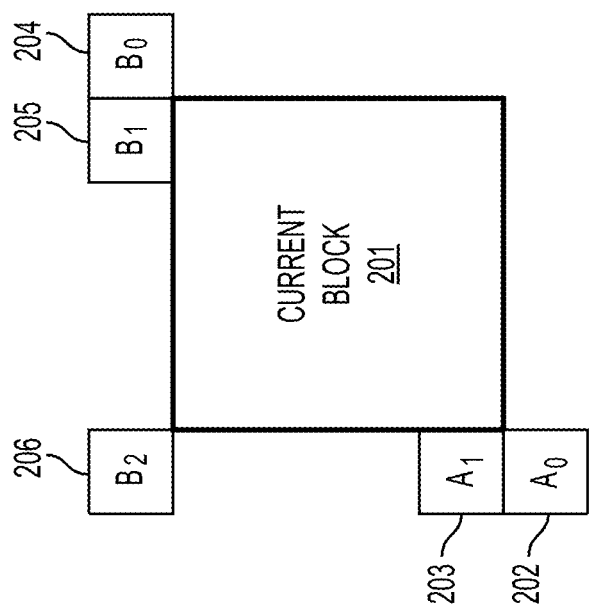
FIG. 2 is a schematic illustration of a current block and its surrounding spatial merge candidates in one example.

There can be variations for the IBC mode. In an example, the IBC mode is treated as a third mode that is different from the intra prediction mode and the inter prediction mode. Accordingly, the BV prediction in the implicit mode (or the merge mode) and the explicit mode are separated from the regular inter mode. A separate merge candidate list can be defined for the IBC mode where entries in the separate merge candidate list are BVs. Similarly, in an example, a BV prediction candidate list in the IBC explicit mode only includes BVs. General rules applied to the two lists (i.e., the separate merge candidate list and the BV prediction candidate list) are that the two lists may follow the same logic as a merge candidate list used in the regular merge mode or an AMVP predictor list used in the regular AMVP mode in terms of the candidate derivation process. For example, the five spatial neighboring locations (e.g., A0, A1, and B0, B1, B2 in FIG. 2), for example, HEVC or VVC inter merge mode are accessed for the IBC mode to derive the separate merge candidate list for the IBC mode.

As described above, a BV of a current block under reconstruction in a picture can have certain constraints, and thus, a reference block for the current block is within a search range. The search range refers to a part of the picture from which the reference block can be selected. For example, the search range may be within certain portions of a reconstructed area in the picture. A size, a position, a shape, and/or the like of the search range can be constrained. Alternatively, the BV can be constrained. In an example, the BV is a two-dimensional vector including an x and a y component, and at least one of the x and y components can be constrained. Constraints can be specified with respect to the BV, the search range, or a combination of the BV and the search range. In various examples, when certain constraints are specified with respect to the BV, the search range is constrained accordingly. Similarly, when certain constraints are specified with respect to the search range, the BV is constrained accordingly.

Figure 9:
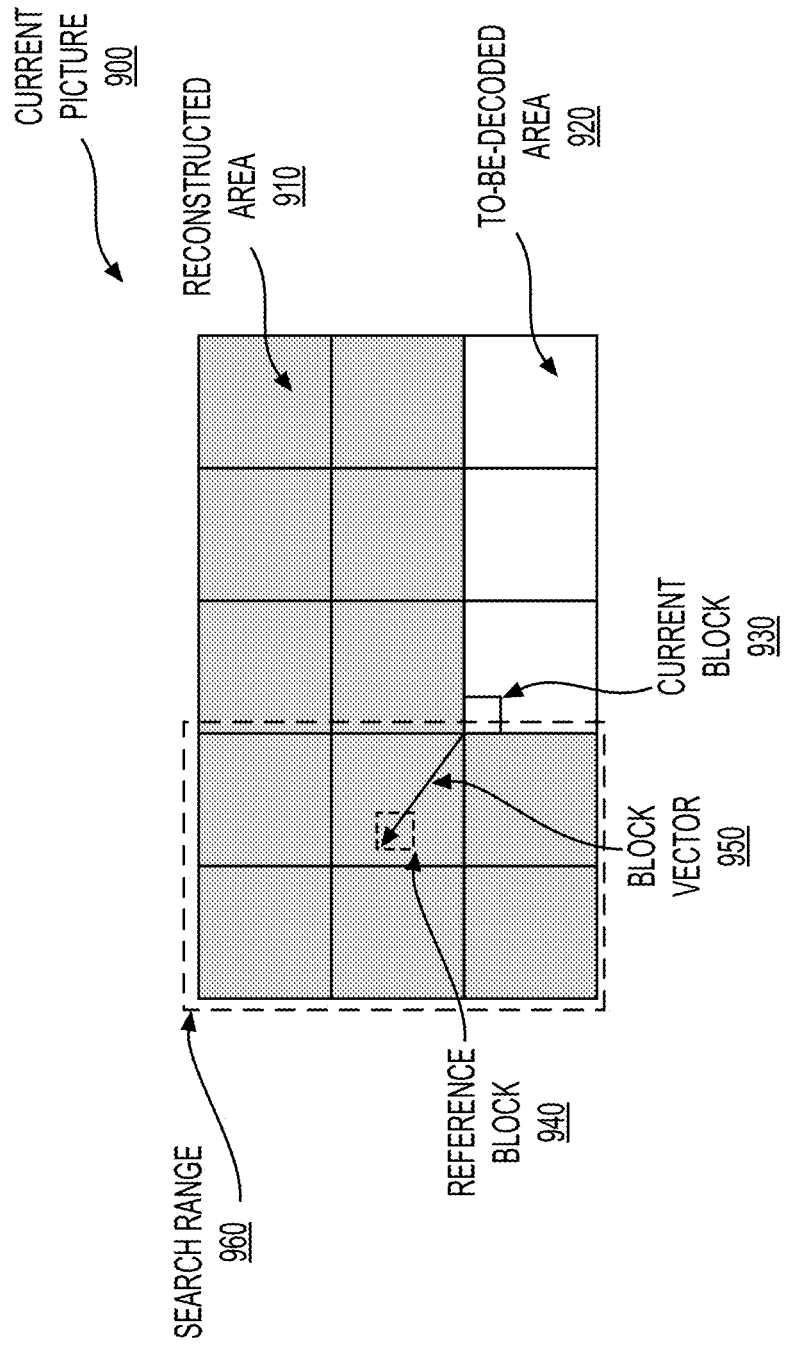
FIG. 9 shows an example of intra block copy according to an embodiment of the disclosure.

FIG. 9 shows an example of intra block copy according to an embodiment of the disclosure. A current picture (900) is to be reconstructed under decoding. The current picture (900) includes a reconstructed area (910) (grey area) and a to-be-decoded area (920) (white area). A current block (930) is under reconstruction by a decoder. The current block (930) can be reconstructed from a reference block (940) that is in the reconstructed area (910). A position offset between the reference block (940) and the current block (930) is referred to as a block vector (950) (or BV (950)). In the FIG. 9 example, a search range (960) is within the reconstructed area (910), the reference block (940) is within the search range (960), and the block vector (950) is constrained to point to the reference block (940) within the search range (960).

Various constraints can be applied to a BV and/or a search range. In an embodiment, a search range for a current block under reconstruction in a current CTB is constrained to be within the current CTB.

In an embodiment, an effective memory requirement to store reference samples to be used in intra block copy is one CTB size. In an example, the CTB size is 128×128 samples. A current CTB includes a current region under reconstruction. The current region has a size of 64×64 samples. Since a reference memory can also store reconstructed samples in the current region, the reference memory can store 3 more regions of 64×64 samples when a reference memory size is equal to the CTB size of 128×128 samples. Accordingly, a search range can include certain parts of a previously reconstructed CTB while a total memory requirement for storing reference samples is unchanged (such as 1 CTB size of 128×128 samples or 4 64×64 reference samples in total). In an example, the previously reconstructed CTB is a left neighbor of the current CTB, such as shown in FIG. 10.

Figure 10:
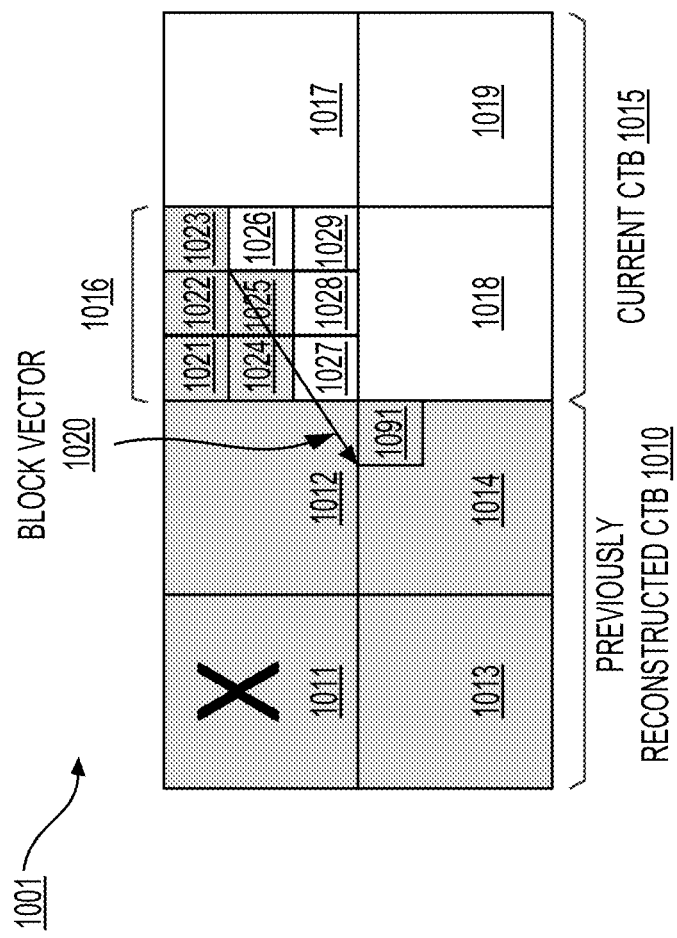
FIG. 10 shows an example of intra block copy according to an embodiment of the disclosure.

FIG. 10 shows an example of intra block copy according to an embodiment of the disclosure. A current picture (1001) includes a current CTB (1015) under reconstruction and a previously reconstructed CTB (1010) that is a left neighbor of the current CTB (1015). CTBs in the current picture (1001) have a CTB size, such as 128×128 samples, and a CTB width, such as 128 samples. The current CTB (1015) includes 4 regions (1016)-(1019), where the current region (1016) is under reconstruction. The current region (1016) includes a plurality of coding blocks (1021)-(1029). Similarly, the previously reconstructed CTB (1010) includes 4 regions (1011)-(1014). The coding blocks (1021)-(1025) are reconstructed, the current block (1026) is under reconstruction, and the coding blocks (1026)-(1027) and the regions (1017)-(1019) are to be reconstructed.

The current region (1016) has a collocated region (i.e., the region (1011), in the previously reconstructed CTB (1010)). A relative position of the collocated region (1011) with respect to the previously reconstructed CTB (1010) can be identical to a relative position of the current region (1016) with respect to the current CTB (1015). In the example illustrated in FIG. 10, the current region (1016) is a top left region in the current CTB (1015), and thus, the collocated region (1011) is also a top left region in the previously reconstructed CTB (1010). Since a position of the previously reconstructed CTB (1010) is offset from a position of the current CTB (1015) by the CTB width, a position of the collocated region (1011) is offset from a position of the current region (1016) by the CTB width.

In an embodiment, a collocated region of the current region (1016) is in a previously reconstructed CTB where a position of the previously reconstructed CTB is offset by one or multiples of the CTB width from the positon of the current CTB (1015), and thus, a position of the collocated region is also offset by a corresponding one or multiples of the CTB width from the position of the current region (1016). The position of the collocated region can be left shifted, up shifted, or the like from the current region (1016).

As described above, a size of a search range for the current block (1026) is constrained by the CTB size. In the FIG. 10 example, the search range can include the regions (1012)-(1014) in the previously reconstructed CTB (1010) and a portion of the current region (1016) that is already reconstructed, such as the coding blocks (1021)-(1025). The search range further excludes the collocated region (1011) so that the size of the search range is within the CTB size. Referring to FIG. 10, a reference block (1091) is located in the region (1014) of the previously reconstructed CTB (1010). A block vector (1020) indicates an offset between the current block (1026) and the respective reference block (1091). The reference block (1091) is in the search range.

The example illustrated in FIG. 10 can be suitably adapted to other scenarios where a current region is located at another location in the current CTB (1015). In an example, when a current block is in the region (1017), a collocated region for the current block is the region (1012). Therefore, a search range can include the regions (1013)-(1014), the region (1016), and a portion of the region (1017) that is already reconstructed. The search range further excludes the region (1011) and the collocated region (1012) so that the size of the search range is within the CTB size. In an example, when a current block is in the region (1018), a collocated region for the current block is the region (1013). Therefore, a search range can include the region (1014), the regions (1016)-(1017), and a portion of the region (1018) that is already reconstructed. The search range further excludes the regions (1011)-(1012) and the collocated region (1013) so that the size of the search range is within the CTB size. In an example, when a current block is in the region (1019), a collocated region for the current block is the region (1014). Therefore, a search range can include the regions (1016)-(1018), and a portion of the region (1019) that is already reconstructed. The search range further excludes the previously reconstructed CTB (1010) so that the size of the search range is within the CTB size.

In the above description, a reference block can be in the previously reconstructed CTB (1010) or the current CTB (1015).

In an embodiment, a search range can be specified as below. In an example, a current picture is a luma picture and a current CTB is a luma CTB including a plurality of luma samples and a BV (mvL) satisfies the following constraints for bitstream conformance. In an example, the BV (mvL) has a fractional resolution (e.g., 1/16-pel resolution).

The constraints include first conditions that a reference block for the current block is already reconstructed. When the reference block has a rectangular shape, a neighboring block availability checking process (or a reference block availability checking process) can be implemented to check whether a top left sample and a bottom right sample of the reference block are reconstructed. When both the top left sample and the bottom right sample of the reference block are reconstructed, the reference block is determined to be reconstructed.

For example, when a derivation process for reference block availability is invoked with a position (xCurr, yCurr) of a top left sample of the current block set to be (xCb, yCb) and a position (xCb+(mvL[0]>>4), yCb+(mvL[1]>>4)) of the top left sample of the reference block as inputs, an output is equal to TRUE when the top left sample of the reference block is reconstructed where the block vector mvL is a two-dimensional vector having a x component mvL[0] and a y component mvL[1]. When the BV (mvL) has a fractional resolution, such as 1/16-pel resolution, the x component mvL[0] and the y component mvL[1] are shifted to have an integer resolution, as indicated by mvL[0]>>4 and mvL[1]>>4, respectively.

Similarly, when a derivation process for block availability is invoked with the position (xCurr, yCurr) of the top left sample of the current block set to be (xCb, yCb) and a position (xCb+(mvL[0]>>4)+cbWidth−1, yCb+(mvL[1]>>4)+cbHeight−1) of the bottom right sample of the reference block as inputs, an output is equal to TRUE when the bottom right sample of the reference block is reconstructed. The parameters cbWidth and cbHeight represent a width and a height of the reference block.

The constraints can also include at least one of the following second conditions: 1) a value of (mvL[0]>>4)+cbWidth is less than or equal to 0, which indicates that the reference block is to the left of the current block and does not overlap with the current block; 2) a value of (mvL[1]>>4)+cbHeight is less than or equal to 0, which indicates that the reference block is above the current block and does not overlap with the current block.

The constraints can also include that the following third conditions are satisfied by the block vector mvL:

$$(yCb+(mvL[1]>>4))>>CtbLog2SizeY = yCb>>CtbLog2SizeY \quad (1)$$

$$(yCb+(mvL[1]>>4+cbHeight-1)>>CtbLog2SizeY = yCb>>CtbLog2Size \quad (2)$$

$$(xCb+(mvL[0]>>4))>>CtbLog2SizeY >= (xCb>>CtbLog2SizeY)-1 \quad (3)$$

$$(xCb+(mvL[0]>>4)+cbWidth-1)>>CtbLog2SizeY \; (xCb>>CtbLog2SizeY) \quad (4)$$

where the parameters CtbLog2SizeY represents the CTB width in log2 form. For example, when the CTB width is 128 samples, CtbLog2SizeY is 7. Eqs. (1)-(2) specify that a CTB including the reference block is in a same CTB row as the current CTB (e.g., the previously reconstructed CTB (1010) is in a same row as the current CTB (1015) when the reference block is in the previously reconstructed CTB (1010)). Eqs. (3)-(4) specify that the CTB including the reference block is either in a left CTB column of the current CTB or a same CTB column as the current CTB. The third conditions as described by Eqs. (1)-(4) specify that the CTB including the reference block is either the current CTB, such as the current CTB (1015), or a left neighbor, such as the previously reconstructed CTB (1010), of the current CTB, similarly to the description with reference to FIG. 10.

The constraints can further include fourth conditions: when the reference block is in the left neighbor of the current CTB, a collocated region for the reference block is not reconstructed (i.e., no samples in the collocated region have been reconstructed). Further, the collocated region for the reference block is in the current CTB. In the FIG. 10 example, a collocated region for the reference block (1091) is the region (1019) that is offset by the CTB width from the region (1014) where the reference block (1091) is located and the region (1019) has not been reconstructed. Therefore, the block vector (1020) and the reference block (1091) satisfy the fourth conditions described above.

In an example, the fourth conditions can be specified as below: when (xCb+(mvL[0]>>4))>>CtbLog2SizeY is equal to (xCb>>CtbLog2SizeY)−1, the derivation process for reference block availability is invoked with the position of the current block (xCurr, yCurr) set to be (xCb, yCb) and a position (((xCb+(mvL[0]>>4)+CtbSizeY)>>(CtbLog2SizeY−1))<<(CtbLog2SizeY−1), ((yCb+(mvL[1]>>4))>>(CtbLog2SizeY−1))<<(CtbLog2SizeY−1)) as inputs, an output is equal to FALSE indicating that the collocated region is not reconstructed, such as shown in FIG. 10.

The constraints for the search range and/or the block vector can include a suitable combination of the first, second, third, and fourth conditions described above. In an example, the constraints include the first, second, third, and fourth conditions, such as shown in FIG. 10. In an example, the first, second, third, and/or fourth conditions can be modified and the constraints include the modified first, second, third, and/or fourth conditions.

According to the fourth conditions, when one of the coding blocks (1022)-(1029) is a current block, a reference block cannot be in the region (1011), and thus, a search range for the one of the coding blocks (1022)-(1029) excludes the region (1011). The reasons why the region (1011) is excluded are specified below: if the reference block is in the region (1011), then a collocated region for the reference block is the region (1016), however, at least samples in the coding block (1021) have been reconstructed, and thus, the fourth conditions are violated. On the other hand, for a coding block to be reconstructed first in a current region, such as a coding block (1121) in a region (1116) in FIG. 11, the fourth conditions does not prevent a reference block to be in the region (1111) because a collocated region (1116) for the reference block has not been reconstructed yet.

Figure 11:
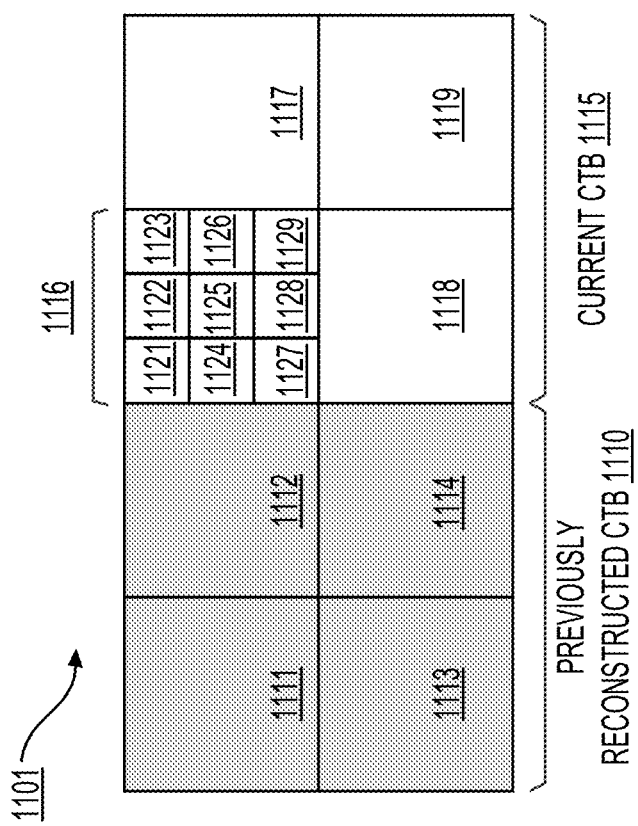
FIG. 11 shows an example of intra block copy according to an embodiment of the disclosure.

FIG. 11 shows an example of intra block copy according to an embodiment of the disclosure. A current picture (1101) includes a current CTB (1115) under reconstruction and a previously reconstructed CTB (1110) that is a left neighbor of the current CTB (1115). CTBs in the current picture (1101) have a CTB size and a CTB width. The current CTB (1115) includes 4 regions (1116)-(1119) where the current region (1116) is under reconstruction. The current region (1116) includes a plurality of coding blocks (1121)-(1129). Similarly, the previously reconstructed CTB (1110) includes 4 regions (1111)-(1114). The current block (1121) under reconstruction is to be reconstructed first in the current region (1116) and the coding blocks (1122)-(1129) are to be reconstructed. In an example, the CTB size is 128×128 samples, each of the regions (1111)-(1114) and (1116)-(1119) is 64×64 samples. A reference memory size is equal to the CTB size and is 128×128 samples, and thus, the search range, when bounded by the reference memory size, includes 3 regions and a portion of an additional region.

Similarly as described with reference to FIG. 10, the current region (1116) has a collocated region (i.e., the region (1111) in the previously reconstructed CTB (1110)). According to the fourth conditions described above, a reference block for the current block (1121) can be in the region (1111), and thus, a search range can include the regions (1111)-(1114). For example, when the reference block is in the region (1111), a collocated region of the reference block is the region (1116), where no samples in the region (1116) have been reconstructed prior to the reconstruction of the current block (1121). However, as described with reference to FIG. 10 and the fourth conditions, for example, after the reconstruction of the coding block (1121), the region (1111) is no longer available to be included in a search range for reconstructing the coding block (1122). Therefore, a tight synchronization and timing control of the reference memory buffer is to be used and can be challenging.

According to some embodiments, when a current block is to be reconstructed first in a current region of a current CTB, a search range can exclude a collocated region of the current region that is in a previously reconstructed CTB where the current CTB and the previously reconstructed CTB are in a same current picture. A block vector can be determined such that a reference block is in the search range that excludes the collocated region in the previously reconstructed CTB. In an embodiment, the search range includes coding blocks that are reconstructed after the collocated region and before the current block in a decoding order.

In the descriptions below, a CTB size can vary and a maximum CTB size is set to be identical to a reference memory size. In an example, the reference memory size or the maximum CTB size is 128×128 samples. The descriptions can be suitably adapted to other reference memory sizes or maximum CTB sizes.

In an embodiment, the CTB size is equal to the reference memory size. The previously reconstructed CTB is a left neighbor of the current CTB, a position of the collocated region is offset by a CTB width from a position of the current region, and the coding blocks in the search range are in at least one of: the current CTB and the previously reconstructed CTB.

FIGS. 12A-12D show examples of intra block copy according to an embodiment of the disclosure. Referring to FIGS. 12A-D, a current picture (1201) includes a current CTB (1215) under reconstruction and a previously reconstructed CTB (1210) that is a left neighbor of the current CTB (1215). CTBs in the current picture (1201) have a CTB size and a CTB width. The current CTB (1215) includes 4 regions (1216)-(1219). Similarly, the previously reconstructed CTB (1210) includes 4 regions (1211)-(1214). In an embodiment, the CTB size is a maximum CTB size and is equal to a reference memory size. In an example, the CTB size and the reference memory size are 128 by 128 samples, and thus, each of the regions (1211)-(1214) and (1216)-(1219) has a size of 64 by 64 samples.

In the examples illustrated in FIGS. 12A-D, the current CTB (1215) includes a top left region, a top right region, a bottom left region, and a bottom right region that correspond to the regions (1216)-(1219), respectively. The previously reconstructed CTB (1210) includes a top left region, a top right region, a bottom left region, and a bottom right region that correspond to the regions (1211)-(1214), respectively.

Figure 12A:
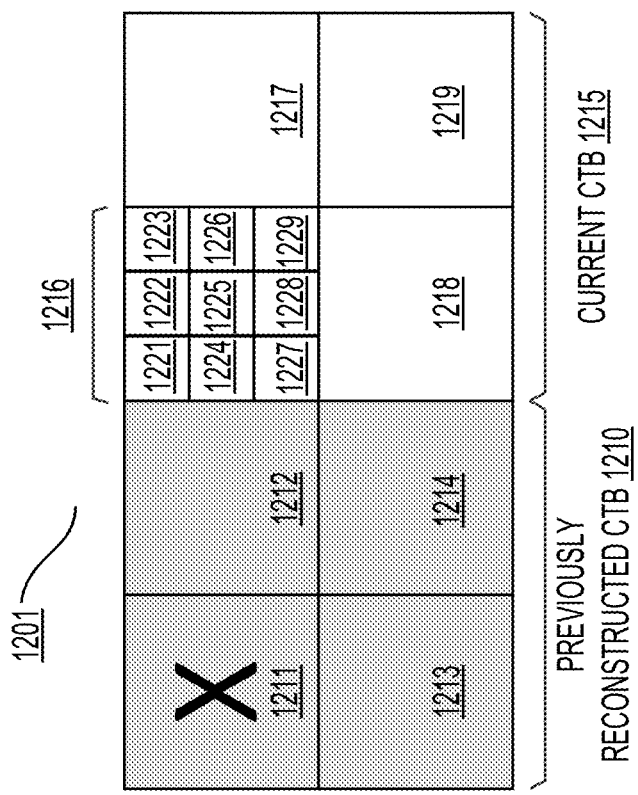
FIGS. 12A-12D show examples of intra block copy according to an embodiment of the disclosure.

Referring to FIG. 12A, the current region (1216) is under reconstruction. The current region (1216) can include a plurality of coding blocks (1221)-(1229). The current region (1216) has a collocated region, i.e., the region (1211), in the previously reconstructed CTB (1210). A search range for one of the coding blocks (1221)-(1229) to be reconstructed can exclude the collocated region (1211). The search range can include the regions (1212)-(1214) of the previously reconstructed CTB (1210) that are reconstructed after the collocated region (1211) and before the current region (1216) in a decoding order.

Referring to FIG. 12A, a position of the collocated region (1211) is offset by the CTB width, such as 128 samples, from a position of the current region (1216). For example, the position of the collocated region (1211) is left shifted by 128 samples from the position of the current region (1216).

Referring again to FIG. 12A, when the current region (1216) is the top left region of the current CTB (1215), the collocated region (1211) is the top left region of the previously reconstructed CTB (1210), and the search region excludes the top left region of the previously reconstructed CTB.

Figure 12B:
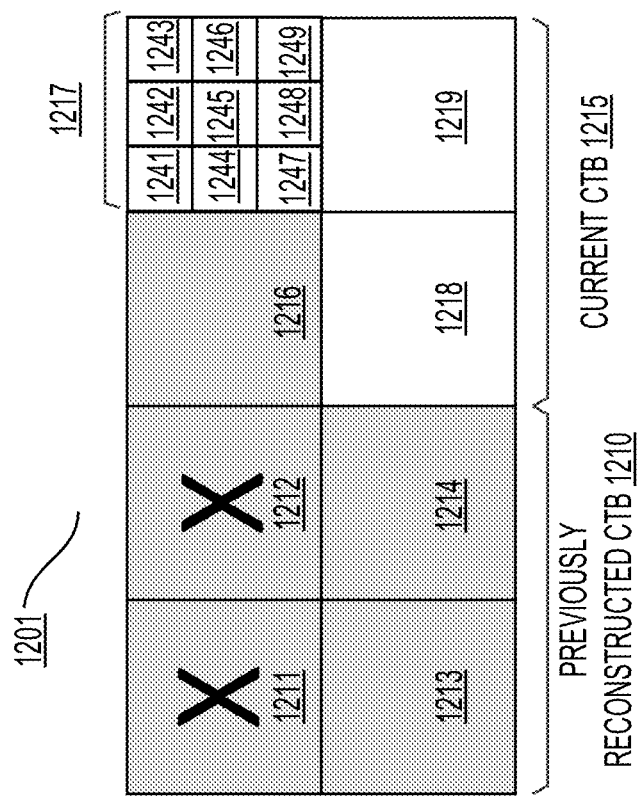

Referring to FIG. 12B, the current region (1217) is under reconstruction. The current region (1217) can include a plurality of coding blocks (1241)-(1249). The current region (1217) has a collocated region (i.e., the region (1212), in the previously reconstructed CTB (1210)). A search range for one of the plurality of coding blocks (1241)-(1249) can exclude the collocated region (1212). The search range includes the regions (1213)-(1214) of the previously reconstructed CTB (1210) and the region (1216) in the current CTB (1215) that are reconstructed after the collocated region (1212) and before the current region (1217). The search range further excludes the region (1211) due to constraint of the reference memory size (i.e., one CTB size). Similarly, a position of the collocated region (1212) is offset by the CTB width, such as 128 samples, from a position of the current region (1217).

In the FIG. 12B example, the current region (1217) is the top right region of the current CTB (1215), the collocated region (1212) is also the top right region of the previously reconstructed CTB (1210), and the search region excludes the top right region of the previously reconstructed CTB (1210).

Figure 12C:
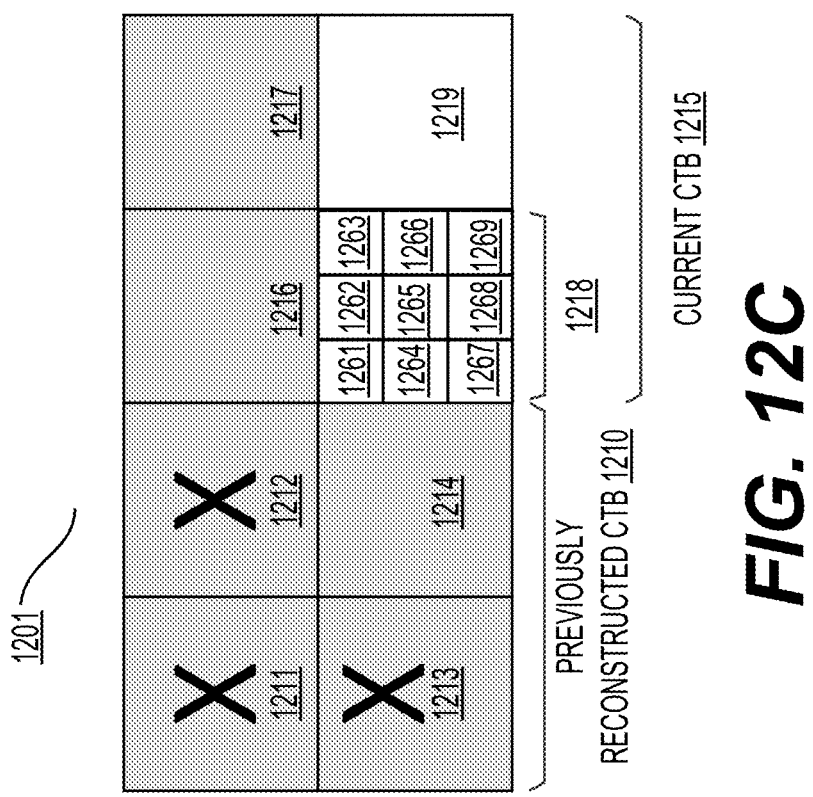

Referring to FIG. 12C, the current region (1218) is under reconstruction. The current region (1218) can include a plurality of coding blocks (1261)-(1269). The current region (1218) has a collocated region (i.e., the region (1213)), in the previously reconstructed CTB (1210). A search range for one of the plurality of coding blocks (1261)-(1269) can exclude the collocated region (1213). The search range includes the region (1214) of the previously reconstructed CTB (1210) and the regions (1216)-(1217) in the current CTB (1215) that are reconstructed after the collocated region (1213) and before the current region (1218). Similarly, the search range further excludes the regions (1211)-(1212) due to constraint of the reference memory size. A position of the collocated region (1213) is offset by the CTB width, such as 128 samples, from a position of the current region (1218). In the FIG. 12C example, when the current region (1218) is the bottom left region of the current CTB (1215), the collocated region (1213) is also the bottom left region of the previously reconstructed CTB (1210), and the search region excludes the bottom left region of the previously reconstructed CTB (1210).

Figure 12D:
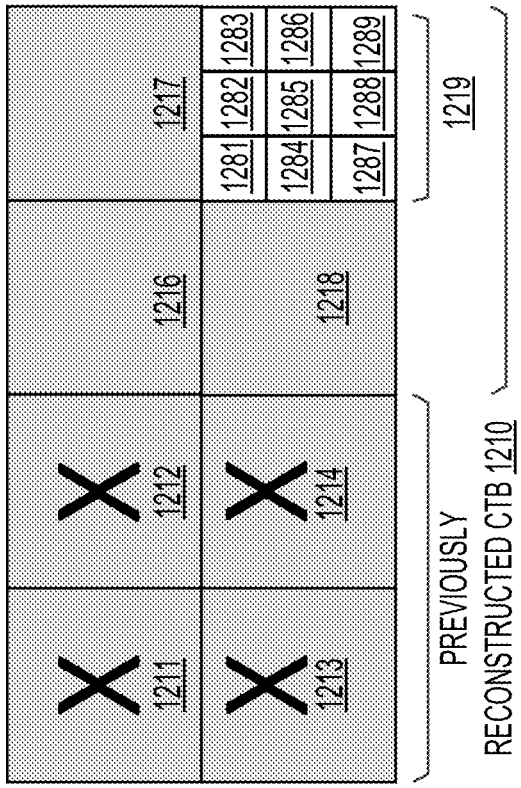

Referring to FIG. 12D, the current region (1219) is under reconstruction. The current region (1219) can include a plurality of coding blocks (1281)-(1289). The current region (1219) has a collocated region (i.e., the region (1214)), in the previously reconstructed CTB (1210). A search range for one of the plurality of coding blocks (1281)-(1289) can exclude the collocated region (1214). The search range includes the regions (1216)-(1218) in the current CTB (1215) that are reconstructed after the collocated region (1214) and before the current region (1219) in a decoding order. The search range excludes the regions (1211)-(1213) due to constraint of the reference memory size, and thus, the search range excludes the previously reconstructed CTB (1210). Similarly, a position of the collocated region (1214) is offset by the CTB width, such as 128 samples, from a position of the current region (1219). In the FIG. 12D example, when the current region (1219) is the bottom right region of the current CTB (1215), the collocated region (1214) is also the bottom right region of the previously reconstructed CTB (1210) and the search region excludes the bottom right region of the previously reconstructed CTB (1210).

Referring back to FIG. 2, the MVs associated with the five surrounding samples (or positions), denoted A0, A1, and B0, B1, B2 (202 through 206, respectively) can be referred to as spatial merge candidates. A candidate list (e.g., a merge candidate list) can be formed based on the spatial merge candidates. Any suitable order can be used to form the candidate list from the positions. In an example, the order can be A0, B0, B1, A1, and B2 where A0 is the first and B2 is the last. In an example, the order can be A1, B1, B0, A0, and B2 where A1 is the first and B2 is the last.

According to some embodiments, motion information of previously coded blocks for a current block (e.g., a coding block (CB) or a current CU) can be stored in a history-based motion vector prediction (HMVP) buffer (e.g., a table) to provide motion vector prediction (MVP) candidates (also referred to as HMVP candidates) for the current block. The HMVP buffer may include one or more HMVP candidates, and can be maintained during an encoding/a decoding process. In an example, a HMVP candidate in the HMVP buffer corresponds to the motion information of a previously coded block. The HMVP buffer can be used in any suitable encoder and/or decoder. HMVP candidate(s) can be added to a merge candidate list after spatial MVP(s) and TMVP(s).

The HMVP buffer can be reset (e.g., emptied) when a new CTU (or a new CTB) row is encountered. When there is a non-subblock inter-coded block, the associated motion information can be added to a last entry of the HMVP buffer as a new HMVP candidate.

In an example, such as in VTM3, a buffer size (denoted by S) of the HMVP buffer is set to be 6, indicating that up to 6 HMVP candidates may be added to the HMVP buffer. In some embodiments, the HMVP buffer may operate in a first-in-first-out (FIFO) rule, and thus, a piece of motion information (or a HMVP candidate) that is stored first in the HMVP buffer is the first to be removed from the HMVP buffer, for example, when the HMVP buffer is full. When inserting a new HMVP candidate to the HMVP buffer, a constrained FIFO rule can be utilized where a redundancy check is first applied to determine whether an identical or similar HMVP candidate is in the HMVP buffer. If an identical or similar HMVP candidate is determined to be in the HMVP buffer, the identical or similar HMVP candidate can be removed from the HMVP buffer and remaining HMVP candidates can be moved forward in the HMVP buffer.

The HMVP candidates can be used in a merge candidate list construction process, for example, in a merge mode. The most recent stored HMVP candidate(s) in the HMVP buffer can be checked in an order and inserted to the merge candidate list after the TMVP candidate(s). A redundancy check can be applied to the HMVP candidates with respect to the spatial or temporal merge candidates that are in the merge candidate list. The descriptions can be suitably adapted to an AMVP mode to construct an AMVP candidate list.

To reduce a number of redundancy check operations, the following simplifications can be used.

(i) A number of HMVP candidates used for generating the merge candidate list can be set as (N<=4)?M:(8−N). N indicates a number of existing candidates in the merge candidate list and M indicates a number of available HMVP candidate(s) in the HMVP buffer. When the number of existing candidates (N) in the merge candidate list is less than or equal to 4, the number of HMVP candidates used for generating the merge candidate list equals to M. Otherwise, the number of HMVP candidates used for generating the merge candidate list equals to (8−N).

(ii) When the total number of available merge candidates reaches the maximum allowed merge candidates minus 1, the merge candidate list construction process from the HMVP buffer is terminated.

When the IBC mode operates as a separate mode from the inter prediction mode, a simplified BV derivation process for the IBC mode can be used. A history-based block vector prediction buffer (referred as a HBVP buffer) can be used to perform BV prediction. The HBVP buffer can be used for storing BV information (e.g., BVs) of previously coded blocks of a current block (e.g., a CB or a CU) in a current picture. In an example, the HBVP buffer is a separate history buffer from other buffer(s), such as a HMVP buffer. The HBVP buffer can be a table.

The HBVP buffer can provide BV predictor (BVP) candidates (also referred to as HBVP candidates) for the current block. The HBVP buffer (e.g., the table) may include one or more HBVP candidates, and can be maintained during an encoding/a decoding process. In an example, a HBVP candidate in the HBVP buffer corresponds to the BV information of a previously coded block in the current picture. The HBVP buffer can be used in any suitable encoder and/or decoder. HBVP candidate(s) can be added to a merge candidate list configured for BV prediction after BV(s) of spatial neighboring block(s) of the current block. The merge candidate list configured for BV prediction can be used for the merge BV prediction mode and/or the non-merge BV prediction mode.

The HBVP buffer can be reset (e.g., emptied) when a new CTU (or a new CTB) row is encountered.

In an example, such as in VVC, a buffer size of the HBVP buffer is set to be 6, indicating that up to 6 HBVP candidates may be added to the HBVP buffer. In some embodiments, the HBVP buffer may operate in the FIFO rule, and thus, a piece of BV information (or a HBVP candidate) that is stored first in the HBVP buffer is the first to be removed from the HBVP buffer, for example, when the HBVP buffer is full. When inserting a new HBVP candidate into the HBVP buffer, a constrained FIFO rule can be utilized where a redundancy check is first applied to determine whether an identical or similar HBVP candidate is in the HBVP buffer. If an identical or similar HBVP candidate is determined to be in the HBVP buffer, the identical or similar HBVP candidate can be removed from the HBVP buffer and remaining HBVP candidates can be moved forward in the HBVP buffer.

The HBVP candidates can be used in a merge candidate list construction process, for example, in the merge BV prediction mode. The most recent stored HBVP candidate(s) in the HBVP buffer can be checked in an order and inserted into the merge candidate list after the spatial candidate(s). A redundancy check can be applied to the HBVP candidates with respect to the spatial merge candidates that are in the merge candidate list.

In an embodiment, a HBVP buffer is established to store one or more pieces of BV information of one or more previously coded blocks coded in the IBC mode. The one or more pieces of BV information can include one or more BVs of the one or more previously coded blocks coded in the IBC mode. Further, each of the one or more pieces of BV information can include side information (or additional information) such as a block size, a block location, and/or the like of the respective previously coded block coded in the IBC mode.

In class-based history-based block vector prediction (also referred to as CBVP), for the current block, one or more pieces of BV information in the HBVP buffer that meet certain conditions can be classified into corresponding categories (also referred to as classes), and thus forming a CBVP buffer. In an example, each piece of BV information in the HBVP buffer is for a respective previously coded block, for example, coded with the IBC mode. The piece of BV information for the previously coded block can include a BV, a block size, a block position, and/or the like. The previously coded block has a block width, a block height, and a block area. The block area can be a multiplication of the block width and the block height. In an example, the block size is represented by the block area. The block position of the previously coded block can be represented by an upper left corner (e.g., an upper left corner of 4×4 area) or an upper left sample of the previously coded block.

Figure 13:
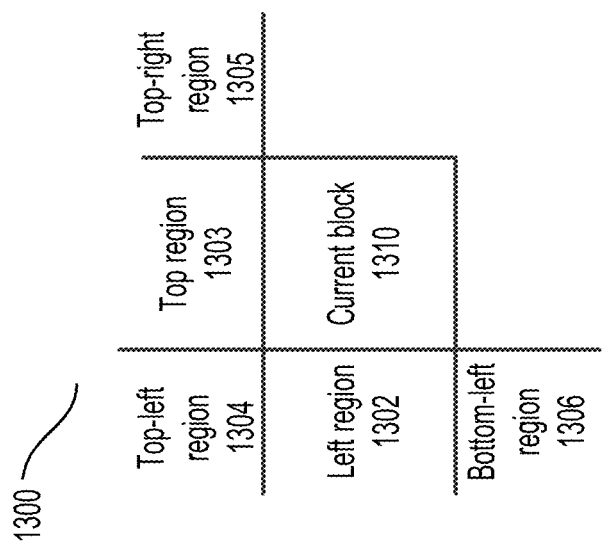
FIG. 13 shows an example of spatial classes for intra block copy block vector prediction for a current block according to an embodiment of the disclosure.

FIG. 13 shows an example of spatial classes for IBC BV prediction for a current block (e.g., a CB, a CU) (1310) according to an embodiment of the disclosure. A left region (1302) can be to the left of the current block (1310). BV information for previously coded block(s) having respective block position(s) in the left region (1302) can be referred to as left candidates or left BV candidates. A top region (1303) can be above the current block (1310). BV information for previously coded block(s) having respective block position(s) in the top region (1303) can be referred to as top candidates or top BV candidates. A top-left region (1304) can be to a top-left of the current block (1310). BV information for previously coded block(s) having respective block position(s) in the top-left region (1304) can be referred to as top-left candidates or top-left BV candidates. A top-right region (1305) can be to a top-right of the current block (1310). BV information for previously coded block(s) having respective block position(s) in the top-right region (1305) can be referred to as top-right candidates or top-right BV candidates. A bottom-left region (1306) can be to a bottom-left of the current block (1310). BV information for previously coded block(s) having respective block position(s) in the bottom-left region (1306) can be referred to as bottom-left candidates or bottom-left BV candidates. Other kinds of spatial classes can also be defined and used in the CBVP buffer.

If the BV information for the previously coded block meets the following conditions, the BV information can be classified into the corresponding categories (or classes).

(i) Class 0: the block size (e.g., the block area) is greater than or equal to a threshold (e.g., 64 pixels).

(ii) Class 1: an occurrence (or a frequency) of the BV is greater than or equal to 2. The occurrence of the BV can refer to a number of times the BV is used to predict previously coded block(s). When a pruning process is used to form the CBVP buffer, the BV can be stored in one entry (instead of in multiples entries having the same BV) when the BV is used multiple times in predicting previously coded blocks. The occurrence of the BV can be recorded.

(iii) Class 2: the block position is in the left region (1302) where a portion (e.g., an upper left corner of 4×4 area) of the previously coded block is to the left of the current block (1310). The previously coded block can be within the left region (1302). Alternatively, the previously coded block can span across multiple regions including the left region (1302) where the block position is in the left region (1302).

(iv) Class 3: the block position is in the top region (1303) where a portion (e.g., the upper left corner of 4×4 area) of the previously coded block is above the current block (1310). The previously coded block can be within the top region (1303). Alternatively, the previously coded block can span across multiple regions including the top region (1303) where the block position is in the top region (1303).

(v) Class 4: the block position is in the top-left region (1304) where a portion (e.g., the upper left corner of 4×4 area) of the previously coded block is at the top-left side of the current block (1310). The previously coded block can be within the top-left region (1304). Alternatively, the previously coded block can span across multiple regions including the top-left region (1304) where the block position is in the top-left region (1304).

(vi) Class 5: the block position is in the top-right region (1305) where a portion (e.g., the upper left corner of 4×4 area) of the previously coded block is at the top-right side of the current block (1310). The previously coded block can be within the top-right region (1305). Alternatively, the previously coded block can span across multiple regions including the top-right region (1305) where the block position is in the top-right region (1305).

(vii) Class 6: the block position is in the bottom-left region (1306) where a portion (e.g., the upper left corner of 4×4 area) of the coded block is at the bottom-left side of the current block (1310). The previously coded block can be within the bottom-left region (1306). Alternatively, the previously coded block can span across multiple regions including the bottom-left region (1306) where the block position is in the bottom-left region (1306).

For each category (or class), the BV of the most recently coded block can be derived as the BVP candidate. The CBVP buffer can be constructed by appending the BV predictor(s) of each category in an order from Class 0 to Class 6. The above description for the CBVP can be suitably adapted to include less classes or additional classes not described above. One or more of the Classes 0-6 can be modified. In an example, each entry in the HBVP buffer is classified into one of the seven Classes 0-6. An index can be signaled to indicate which of the Classes 0-6 is chosen. At a decoder side, the first entry in the chosen class can be used to predict a BV for the current block.

Figure 14:
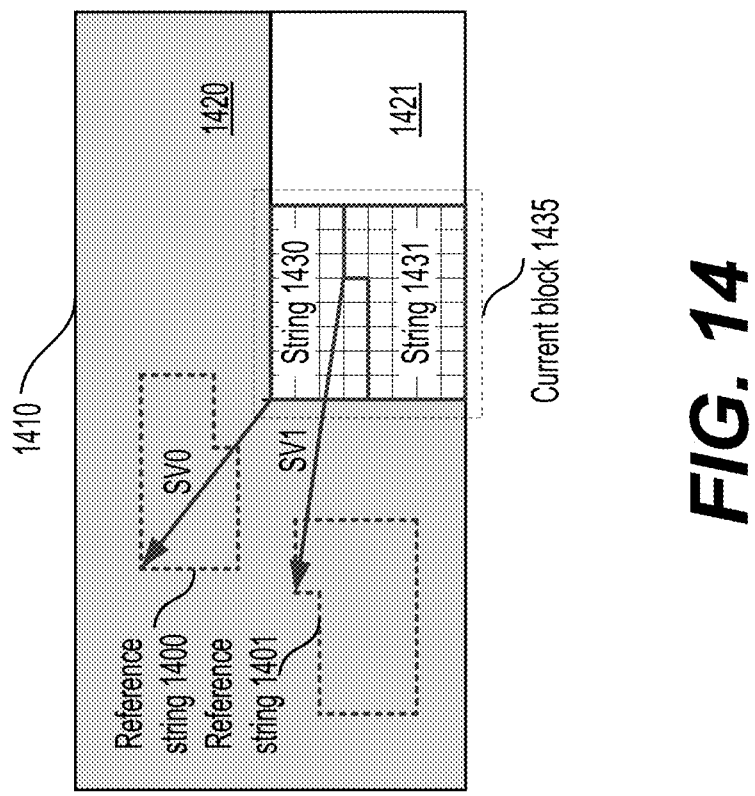
FIG. 14 shows an example of a string copy mode according to an embodiment of the disclosure.

FIG. 14 shows an example of a string copy mode according to an embodiment of the disclosure. The string copy mode can also be referred to as a string matching mode or an intra string copy mode. A current picture (1410) includes a reconstructed region (a grey area) (1420) and a region (1421) that is under reconstruction. A current block (1435) in the region (1421) is under reconstruction. The current block (1435) can be a CB, a CU, or the like. The current block (1435) can include a plurality of strings (e.g., strings (1430) and (1431)). In an example, the current block (1435) is divided into a plurality of continuous strings where one string is followed by a next string along a scan order. The scan order can be any suitable scan order, such as a raster scan order, a traverse scan order, or the like.

The reconstructed region (1420) can be used as a reference area to reconstruct the strings (1430) and (1431).

For each of the plurality of strings, a string offset vector (referred to as an SV) and a length of the string (referred to as a string length) can be signaled. The SV (e.g., a SV0) can be a displacement vector that indicates a displacement between the string (e.g., the string (1430)) to be reconstructed and a respective reference string (e.g., a reference string (1400)) that is located in the reference area (1420) already reconstructed. The reference string can be used to reconstruct the string to be reconstructed. Thus, the SV can indicate where the corresponding reference string is located in the reference area (1420). The string length can also indicate a length of the reference string. Referring to FIG. 14, the current block (1435) is an 8×8 CB including 64 samples and is divided into two strings (e.g., the strings (1430) and (1431)) using the raster scan order. The string (1430) includes first 29 samples of the current block (1435), and the string (1431) includes remaining 35 samples of the current block (1435). The reference string (1400) used to reconstruct the string (1430) can be indicated by a corresponding string vector SV0, and a reference string (1401) used to reconstruct the string (1431) can be indicated by a corresponding string vector SV1.

In general, a string size can refer to a length of a string or a number of samples in a string. Referring to FIG. 14, the string (1430) includes 29 samples, and thus a string size of the string (1430) is 29. The string (1431) includes 35 samples, and thus a string size of the string (1431) is 35. A string location (or a string position) can be represented by a sample position of a sample (e.g., a first sample in a decoding order) in the string.

The above descriptions can be suitably adapted to reconstruct a current block that includes any suitable number of strings. Alternatively, in an example, when a sample in a current block does not have a matching sample in a reference area, an escape sample is signaled, and a value of the escape sample can be coded directly without referring to a reconstructed sample in the reference area.

In the disclosure, vector prediction can include BV prediction in the IBC mode and SV prediction in the string copy mode. The vector prediction can include a skip mode vector prediction, a merge mode (or a direct mode) vector prediction, or the vector prediction with a difference coding. In the skip mode vector prediction and the merge mode vector prediction, a vector (e.g., a BV, a SV) can be recovered from a predictor (or a vector predictor, such as a BV predictor, an SV predictor) directly without using a difference coding. For example, the merge mode vector prediction for the BV prediction is the merge BV prediction mode, and the BV can be equal to the BV predictor. Similarly, the merge mode vector prediction for the SV prediction is the merge SV prediction mode, and the SV can be equal to the SV predictor. The vector prediction with a difference coding for the BV prediction is the explicit mode or the non-merge BV prediction mode.

According to aspects of the disclosure, a history-based SV prediction buffer (referred as a HSVP buffer) can be used to perform SV prediction. The HSVP buffer can be configured to store one or more pieces of previous SV information (e.g., SVs) of one or more previously coded strings coded in the string copy mode of a current picture. The HSVP buffer can be used to predict a current string in a current block of the current picture. In an example, the one or more previously coded strings coded in the string copy mode are decoded prior to the current block. The one or more pieces of previous SV information can include one or more previous SVs of the one or more previously coded strings. Further, each of the one or more pieces of previous SV information can include previous side information (or additional information) such as a string size, a string location, and/or the like of the respective previously coded string. The one or more pieces of previous SV information in the HSVP buffer can include SV prediction (SVP) candidates or HSVP candidates for the current string. The HSVP buffer (e.g., a table) can be maintained during an encoding/a decoding process. The HSVP buffer can be used in any suitable encoder and/or decoder.

According to aspects of the disclosure, the HSVP buffer can be a separate history buffer that stores the one or more pieces of previous SV information in a suitable order, such as a decoding order, a reverse decoding order, or a pre-defined order. Entries (e.g., the one or more pieces of previous SV information) in the HSVP buffer can be used to predict the current string to be reconstructed in the string copy mode. In an example, the HSVP buffer is separate from other history buffer(s), such as a HMVP buffer, a HBVP buffer, and the like.

To determine whether to add a new entry (e.g., a new piece of SV information) into the HSVP buffer, the new piece of SV information can be compared with existing entries (e.g., the one or more pieces of previous SV information) in the HSVP buffer. In an example, the new piece of SV information can be compared with each of the existing entries in the HSVP buffer. When the new piece of SV information is determined to be unique, the new piece of SV information can be added (e.g., stored) into the HSVP buffer. The uniqueness (e.g., whether the new piece of SV information is different from the existing entries in the HSVP) of the new piece of SV information can be determined separately. The uniqueness of the new piece of SV information can be determined based on a new SV of the new piece of SV information and one or more previous SVs of the one or more pieces of previous SV information.

In an example, if a respective vector difference (or a SV difference) between the new SV and each of the one or more previous SVs satisfies a condition (e.g., the respective vector difference is larger than a threshold), the new piece of SV information is determined to be unique or different from the one or more pieces of SV information.

In an example, a vector difference does not satisfy the condition (e.g., the vector difference is not larger than the threshold), new side information (e.g., a new string size) of the new piece of SV information is further compared with the previous side information of the one or more pieces of previous SV information. For example, the new string size is compared with each string size of the one or more pieces of previous SV information. If a string size difference between the new string size and each string size of the one or more pieces of previous SV information satisfies a size condition (e.g., the string size difference is larger than a size threshold), the new string size is determined to be different from the string size(s) of the one or more pieces of previous SV information. Thus, the new SV information is determined to be different from the one or more pieces of SV information.

If the new piece of SV information is different from each of the existing entries in the HSVP buffer, the new piece of SV information can be determined to be unique. Alternatively, to determine whether to add a new entry into the HSVP buffer, the new piece of SV information can be compared with a subset of the existing entries (e.g., a subset of the one or more pieces of previous SV information) in the HSVP buffer, similarly as described above. For example, the subset of the existing entries includes first N1 entries in the HSVP buffer where N1 is a positive integer that is less than a number of entries in the HSVP buffer. When the new piece of SV information is determined to be unique, as described above, the new piece of SV information can be stored into the HSVP buffer.

In some examples, when the new piece of SV information is stored into the HSVP buffer, one of the existing entries in the HSVP buffer is removed.

The HSVP buffer can be reset (e.g., emptied) when a new CTU (or a new CTB) row is encountered.

Similar to the CBVP, a class-based history-based string vector prediction (CSVP) can be established, for example, to predict a current string. In the CSVP, one or more pieces of previous SV information in a HSVP buffer that meet certain conditions can be classified into corresponding categories (or classes), and thus forming a CSVP buffer. In an example, each piece of previous SV information in the HSVP buffer is for a previously coded string that is decoded prior to the current block. The piece of previous SV information for the previously coded string can include a SV, a string size, a string position, and/or the like.

A plurality of categories or classes can be built, for example, based on one or more of: a string size, an occurrence of a SV, a string position, and the like, similar as described above with reference to a CBVP buffer. In an example, the plurality of categories is built based on one or more of: the string size and the occurrence of a SV. An index can be used to point to a first entry in a particular class to select an SV predictor from the plurality of classes.

According to aspects of the disclosure, if the previous SV information for the previously coded string meets the following conditions, the previous SV information can be classified into the corresponding categories (or classes).

(i) Class 0: the string size is greater than or equal to a threshold.
(ii) Class 1: an occurrence (or a frequency) of the SV is greater than or equal to 2. The occurrence of the SV refers to a number of times the SV is used to predict previously coded string(s). When a pruning process is used to form the CSVP buffer, the SV can be stored in one entry (instead of in multiples entries having the same SV) when the SV is used multiple times in predicting previously coded strings. In an example, the occurrence of the SV is recorded.

The CSVP buffer can be constructed by appending the SV predictor(s) of each category in an order from Class 0 to Class 6. As described above, an index (e.g., a flag) can be used to point to a first entry in a particular class to select an SV predictor from the plurality of classes. In some examples, when the index is signaled, the SV predictor can be determined to be an SV for the current string. Otherwise, when the index is not signaled, the SV of the current string can be coded directly.

According to aspects of the disclosure, coding information for a current block of a current picture can be decoded. The coding information can indicate that a coding mode for the current block is one of: the IBC mode and the string copy mode.

A history buffer can be configured to store vector information of previously decoded units of samples in the current picture. In an example, the previously decoded units of samples include a block previously decoded in the IBC mode and a string previously decoded in the string copy mode. The previously decoded units of samples can be decoded prior to the current block. The vector information can be included as entries of the history buffer. Each of the vector information can include a vector (e.g., a BV, an SV) used to predict a corresponding one of the previously decoded units of samples. In some examples, each of the vector information further includes additional information (or side information) of the one of the previously decoded units of samples, such as a unit size, a unit location of the one of the previously decoded units of samples. Each of the previously decoded units of samples can be a block (e.g., a CB) or a string.

Current vector information for a current unit of samples in the current block can be determined based on the coding mode for the current block. In an example, the current vector information is determined based on the coding mode for the current block and the history buffer. The current vector information can include a current vector used to predict the current unit of samples. If the coding mode of the current block is the IBC mode, the current vector is a current BV for the current block. If the coding mode is the string copy mode, the current vector is a current SV for a current string in the current block. The current unit of samples can be reconstructed based on the current vector information including, for example, the current vector.

According to aspects of the disclosure, the history buffer can be a joint buffer to store HBVP candidate(s) for previously coded block(s) and HSVP candidate(s) for previously coded string(s). The HSVP candidate(s) (e.g., SV(s)) and HBVP candidate(s) (e.g., BV(s)) can be stored in a suitable order, such as a decoding order, a reverse decoding order, or a pre-defined order in the history buffer. The entries in the history buffer can be used to predict the current vector information for the current unit of samples in the current block, such as the current SV if the coding mode is the string copy mode or the current BV if the coding mode is the IBC mode.

In an embodiment, the coding mode for the current block is the IBC mode, and the current unit of samples is the current block. Accordingly, a BV predictor candidate list for the current block can be determined based at least on the vector information in the history buffer, and the current BV can be determined based on the BV predictor candidate list where the current vector information includes the current BV. The BV predictor candidate list can include the BV(s) and/or the SV(s) in the history buffer. The BV predictor candidate list can further include spatial candidate(s) of the current block.

When the current block is predicted using the merge BV prediction mode or the skip mode vector prediction, the current BV is predicted from the BV predictor candidate list. For example, the current BV is one of the BV(s) and the SV(s) in the history buffer. When the current block is predicted using the non-merge BV prediction mode, the current BV is predicted from the BV predictor candidate list and a vector difference between the current BV and a BV candidate (e.g., one of the BV(s) and the SV(s) in the history buffer) in the BV predictor candidate list.

In an embodiment, the coding mode for the current block is the string copy mode. Thus, the current unit of samples is the current string in the current block, and the current SV is for the current string. The current SV for the current string can be determined from the vector information in the history buffer. An index (e.g., a flag) can be signaled to point to an entry (e.g., one of the vector information) in the history buffer. If the entry is for the block previously decoded in the IBC mode, the current SV for the current string is the BV used to predict the block previously decoded in the IBC mode. If the entry is for the string previously decoded in the string copy mode, the current SV for the current string is the SV used to predict the string previously decoded in the string copy mode. Alternatively, the current SV for the current string can be coded directly, and thus can be determined directly, for example, from the coding information when no index is signaled to indicate which entry in the history buffer is to be used to predict the current SV.

According to aspects of the disclosure, whether to add the current vector information into the history buffer can be determined based on the current vector information and one or more of the vector information in the history buffer. When the current vector information is different from the one or more of the vector information, the current vector information can be stored in the history buffer. When the current vector information is different from the one or more of the vector information, the current vector information is considered to be unique. The one or more of the vector information can include (i) a subset (e.g., first N2 entries) of the vector information in the history buffer or (ii) the vector information in the history buffer. N2 can be a positive integer that is less than a number of pieces of information in the vector information in the history buffer.

The uniqueness of the current vector information can be determined based on vector difference(s) between the current vector and respective vector(s) (e.g., SV(s) and/or BV(s)) of the one or more of the vector information in the history buffer. In an example, each of the one or more of the vector information includes a previous vector that is a BV or a SV. If a difference (also referred to as a vector difference) between the current vector and each previous vector of the one or more of the vector information in the history buffer satisfies a condition (e.g., the difference is larger than a pre-determined threshold), the current vector information can be determined to be unique or different from the one or more of the vector information. Thus, the current vector information can be stored into the history buffer. Otherwise, if the difference between the current vector and a previous vector of one of the one or more of the vector information does not satisfy the condition (e.g., the difference is not larger than the pre-determined threshold), the current vector information can be determined not to be different from the one of the one or more of the vector information, and thus the current vector information is not unique. In an example, the current vector information that is not unique is not stored into the history buffer. In an example, an occurrence of the previous vector of the one of the one or more of the vector information is increased by 1 and the occurrence is recorded.

The current vector information can include additional current information, such as a current unit size, a current unit location, and/or the like of the current unit of samples. The current unit size can indicate a number of samples in the current unit of samples. The one or more of the vector information in the history buffer can include additional previous information, such as previous unit size(s), previous unit location(s) of the corresponding one or more of the previously decoded units of samples in the current picture. Each previous unit size can indicate a number of samples in the respective previous decoded unit of samples.

In an embodiment, the uniqueness of the current vector information can be determined based on the additional current information of the current unit of samples and the additional previous information of the one or more of the previously decoded units of samples. For example, the current vector information is determined to be different from the one or more of the vector information if a size difference between the current unit size and each respective previous unit size of the one or more of the vector information is larger than a pre-determined size threshold.

In an embodiment, in addition to the vector difference(s) between the current vector and the respective previous vector(s) (e.g., SV(s) and/or BV(s)) of the one or more of the vector information, the uniqueness of the current vector information can be determined further based on the additional current information of the current unit of samples and the additional previous information of the one or more of the previously decoded units of samples. For example, when a difference between the current vector and a previous vector of one of the one or more of the vector information in the history buffer is not larger than the pre-determined threshold, the current vector information is determined to be different from the one or more of the vector information if the size difference between the current unit size and each respective previous unit size of the one or more of the vector information is larger than the pre-determined size threshold. Further, the current vector information can be stored in the history buffer, and the one of the one or more of the vector information can be removed from the history buffer. Alternatively, the current vector information can replace the one of the one or more of the vector information in the history buffer. In an example, an occurrence of the previous vector of the one of the one or more of the vector information is increased by 1 and the occurrence is recorded as the occurrence of the current vector of the current vector information.

According to an aspect of the disclosure, the vector information in the history buffer can include previous vectors, previous unit sizes, and previous unit locations of the corresponding previously decoded unit of samples. Thus, each of the vector information can be classified into one of a plurality of categories (or classes) based on but not limited to an occurrence of the previous vector, the previous unit size, the previous unit location, and/or the like. The occurrence of the previous vector can refer to a number of times that the previous vector is used to predict one or more previously decoded units of samples. In an example, the same previous vector is used to predict two previously decoded units of samples, and thus the corresponding one of the vector information includes the previous vector, the previous unit size, and the previous unit location of the most recently decoded units of samples. The occurrence of the previous vector is 2. In an example, each of the vector information can be classified into one of a plurality of categories based on the occurrence of the previous vector and the previous unit size. Accordingly, the history buffer can be a class-based history buffer, similar to that described above with reference to the CBVP and CSVP. The class-based history buffer can be a joint buffer that includes CBVP candidate(s) and CSVP candidate(s). In an example, the coding information for the current block further includes an index (e.g., a flag). The current vector information can be determined to be an entry (e.g., a first entry) in one of the plurality of categories where the one of the plurality of categories can be indicated by the index.

According to an aspect of the disclosure, one of the vector information in the history buffer can include a string vector and one of (i) a string location and (ii) a string size of the string previously decoded in the string copy mode. The string location can be a location of a pre-determined sample in the string previously decoded in the string copy mode. The pre-determined sample can be a first sample, a last sample, or any suitable sample in a scanning order (e.g., a decoding order, a reverse decoding order, or the like). The string size can be a number of samples in the string previously decoded in the string copy mode.

According to aspects of the disclosure, coding information for a current block can be decoded where the coding information can indicate that the current block is coded in the string copy mode. In an example, the current block includes one or more strings.

A SV and a string length of a current string in the current block can be determined based on the coding information. In an example, the current string is one of the one or more strings. The string length can be any suitable integer, such as in a range from 1 to (a block size−1) where the block size (e.g., a block area) is a number of samples in the current block. The block size can be equal to a block width multiplied by a block height. According to an aspect of the disclosure, the string length can be one or a multiple of a positive integer L, for example, the string length is equal to N3 times L. N3 is a positive integer and L is larger than 1. In an example, L is less than or equal to the block size of the current block divided by 2. For example, the string length can be L, 2L, 3L, or the like. If L is 4, the string length is 4, 8, 12, or the like.

The current string can be reconstructed based on the SV and the string length of the current string.

In an example, the current block is a luma block and L is 4 or 4 luma samples.

In an example, the current block is a chroma block. A chroma subsampling format is 4:2:0 indicating that the chroma block has half a height and half a width of a corresponding luma block. If the chroma block is coded jointly with the corresponding luma block, L is 2 or 2 chroma samples. If the chroma block is coded separately with the corresponding luma block, L is 4 or 4 chroma samples.

In an example, the current block further includes escape samples that are outside of the one or more strings. The escape samples are not predicted using reference string(s) indicated by corresponding SV(s). The escape samples can be decoded directly. A number of the escape samples can be one or a multiple of L. In an example, a number of escape samples in a same row of the current block is one or a multiple of L, such as L, 2L, or the like.

According to aspects of the disclosure, the coding information can further include a syntax element (or a length syntax element) indicating the string length. Instead of coding the actual string length (e.g., 8 samples) of the current string, the string length can be coded where the length syntax element has a coded value (e.g., 2) that is equal to the string length divided by L (e.g., 4).

After decoding the syntax element, the coded value (e.g., 2) of the syntax element can be multiplied by L to recover the string length (e.g., 8).

The coded value of the syntax element can be an integer that is in a range from 1 to (M1/L−1), and M1 can be the block size (e.g., the number of samples in the current block). For example, if M1 is 256, L is 4, and thus M1/L is 64 and the range is from 1 to 63. Accordingly, the coded value of the syntax element can be 1, 2, . . . , or 63 indicating the string length to be 4, 8, . . . , or 252, respectively. Thus, by coding the value of the syntax element as one or multiples of L, the range for the coded value of the syntax element can be reduced from a range of L to (M1−L) to the range of 1 to (M1/L−1). For example, when M1 is 256 and L is 4, the range of the value of the syntax element can be reduced from a range of 4 to 252 (with a step of 4) to the range of 1 to 63 (with a step of 1), and thus coding efficiency can be increased.

Multiple resolutions (or multiple precisions) can be used in coding the SV. A syntax element (such as a resolution syntax element, an indicator) can be signaled in a video bitstream to indicate with which resolution the SV is coded from a predefined set of resolutions. In an example, the resolution syntax element that indicates the resolution used for the SV can be decoded from the coding information.

In an embodiment, the predefined set of resolutions includes two resolutions: (i) 1-sample (1-pel) resolution and (ii) 4-sample (4-pel) resolution, and thus the resolution used for the SV can be chosen from the 1-pel resolution or the 4-pel resolutions using the resolution syntax element (such as a 1-bit indicator) having 1 bit. If the 4-pel resolution is chosen, both an x component and a y component of the SV are one or multiples of 4. Thus, a decoded SV (or an intermediate SV when no prediction is used) or a SV difference (or an intermediate SV difference) can be left shifted by 2 bits to reconstruct the SV (or the real SV). The operation of a left shift by 2 bits is equivalent to multiplying the intermediate SV or the intermediate SV difference by 4.

A string size (or a string length) can represent a number of samples in a string in a block (e.g., a CB or a CU). In an example, the string size is a number from 1 up to (M1−1) where M1 is the block size (e.g., a number of samples in the block). In an example, as described above, the string size is one or a multiple of L and is in a range from L to (M1−L) with a step of L. Length information indicating the respective string size can be signaled for each coded string in the block. According to aspects of the disclosure, last length information of a last coded string (e.g., a string that is coded last) in the block does not need to be signaled. In an example, referring to FIG. 14, the string (1430) is coded (e.g., encoded and decoded) first followed by the string (1431), and thus the string (1431) is the last coded string in the current block (1435). Alternatively, if the string (1431) is coded first followed by the string (1430), the string (1430) is the last coded string in the current block (1435). The last length information can indicate a last string size (or a last string length) of the last coded string. Thus, the last string size of the last coded string is not signaled.

When the last string size of the last coded string is not signaled, the last string size can be inferred from a number of already coded samples in the block. The last string size can be inferred from the number of samples in the block and the number of already coded samples in the block. In an example, the block includes a plurality of strings, the number of already coded samples in the block is determined from one or more string lengths of one or more remaining strings in the plurality of strings. Accordingly, the last string length can be determined based on (i) the number of samples in the current block and (ii) the one or more string lengths of the one or more remaining strings in the plurality of strings.

For example, referring to FIG. 14, the current block (1435) includes the two strings: the strings (1430) and (1431). The string (1430) is coded first and the string (1431) is coded last after coding the string (1430). The string (1431) is the last coded string in the current block (1435) and thus a last string length of the string (1431) does not need to be coded. The last string length can be inferred from the block size (e.g., 64 samples) and a number of already coded samples in the current block (1435). In the example of FIG. 14, the number of the already coded samples in the current block (1435) is the string size (e.g., 29) of the string (1430). The last string length can be inferred to be equal to the block size (e.g., 64) minus the number (e.g., 29) of the already coded samples in the current block (1435), and thus is 35 samples.

A flag (e.g., a last-coded string flag) can be signaled for one of the plurality of strings in the block to indicate whether the one of the plurality of strings is a last coded string in the block (e.g., a string that is coded last in the block). If the flag is true, the one of the plurality of strings is the last coded string in the block. A string size of the one of the plurality of strings (e.g., the last coded string) does not need to be signaled.

A flag (e.g., a last-coded string flag) can be signaled for each of the plurality of strings in the block. Referring to FIG. 14, a first flag (or a first last-coded string flag) is signaled for the string (1430) and a second flag (or a second last-coded string flag) is signaled for the string (1431). The first flag is false indicating that the string (1430) is not the last coded string, and the second flag is true indicating that the string (1431) is the last coded string.

The flag for the one of the plurality of strings can be context coded, for example, using context-adaptive binary arithmetic coding (CABAC). The context modeling of the flag can depend on a string position of the one of the plurality of strings. As described above, the string position can be represented by a position of a sample (e.g., a first sample in a decoding order) in the one of the plurality of strings.

The context modeling of the flag can depend on a number of remaining samples in the block where the remaining samples are coded before the one of the plurality of strings.

In an example, the flag does not need to be signaled if the one of the plurality of strings is the first string in the block.

Figure 15:
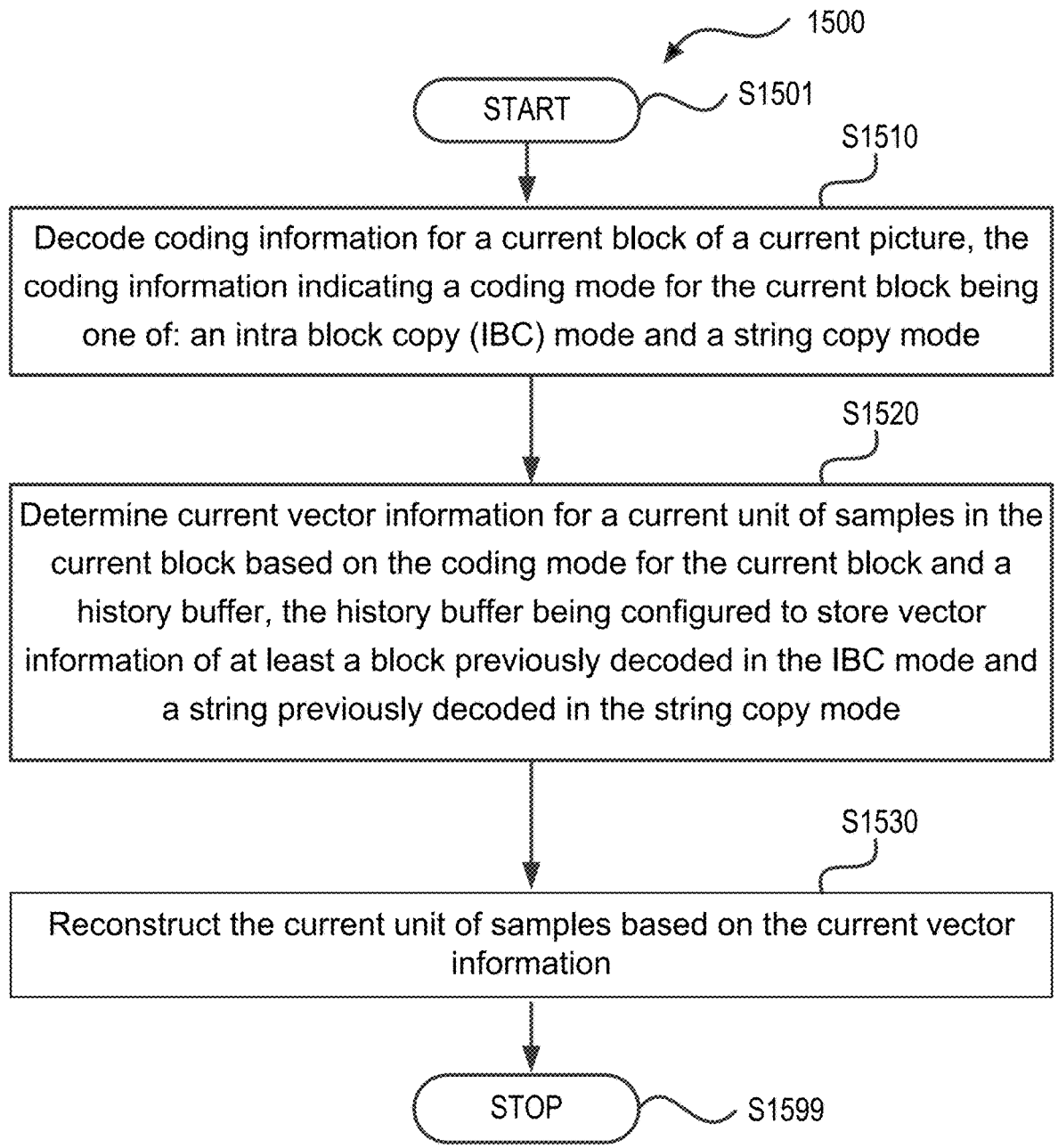
FIG. 15 shows a flow chart outlining a process (1500) according to an embodiment of the disclosure.

FIG. 15 shows a flow chart outlining a process (1500) according to an embodiment of the disclosure. The process (1500) can be used to reconstruct a block or a string in a picture of a coded video sequence. The process (1500) can be used in the reconstruction of the block to generate a prediction block for the block under reconstruction. The term block in the disclosure may be interpreted as a prediction block, a CB, a CU, or the like. In various embodiments, the process (1500) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1500) is implemented in software instructions, thus when the processing circuitry executes the software instructions, the processing circuitry performs the process (1500). The process starts at (S1501) and proceeds to (S1510).

At (S1510), coding information for a current block of a current picture can be decoded. The coding information can indicate a coding mode for the current block being one of: the IBC mode and the string copy mode.

At (S1520), current vector information for a current unit of samples in the current block can be determined based on the coding mode for the current block and a history buffer. The history buffer can be configured to store vector information of previously decoded units of samples in the current picture. In an example, the previously decoded units of samples include a block previously decoded in the IBC mode and a string previously decoded in the string copy mode. In an example, the previously decoded units of samples are decoded prior to the current block. The history buffer can be a joint buffer that combines a HSVP buffer and a HBVP buffer.

The vector information can be stored as entries of the history buffer. Each of the vector information can include a vector (e.g., a BV, an SV) used to predict a corresponding one of the previously decoded units of samples. In some examples, each of the vector information further includes additional information (or side information) of the one of the previously decoded units of samples, such as a unit size, a unit location of the one of the previously decoded units of samples. Each of the previously decoded units of samples can be a block (e.g., a CB) or a string.

The current vector information can include a current vector used to predict the current unit of samples. If the coding mode of the current block is the IBC mode, the current unit of samples is the current block, and the current vector is a current BV for the current block. If the coding mode is the string copy mode, the current unit of samples is a current string in the current block, and the current vector is a current SV for the current string in the current block.

At (S1530), the current unit of samples can be reconstructed based on the current vector information including, for example, the current vector.

The process (1500) can be suitably adapted. Step(s) in the process (1500) can be modified and/or omitted. Additional step(s) can be added. Any suitable order of implementation can be used. For example, when the current vector information is determined to be unique, as described above, the current vector information can be stored into the history buffer. In some examples, a pruning process is used and one of the vector information in the history buffer is removed when the current vector information is stored into the history buffer.

Figure 16:
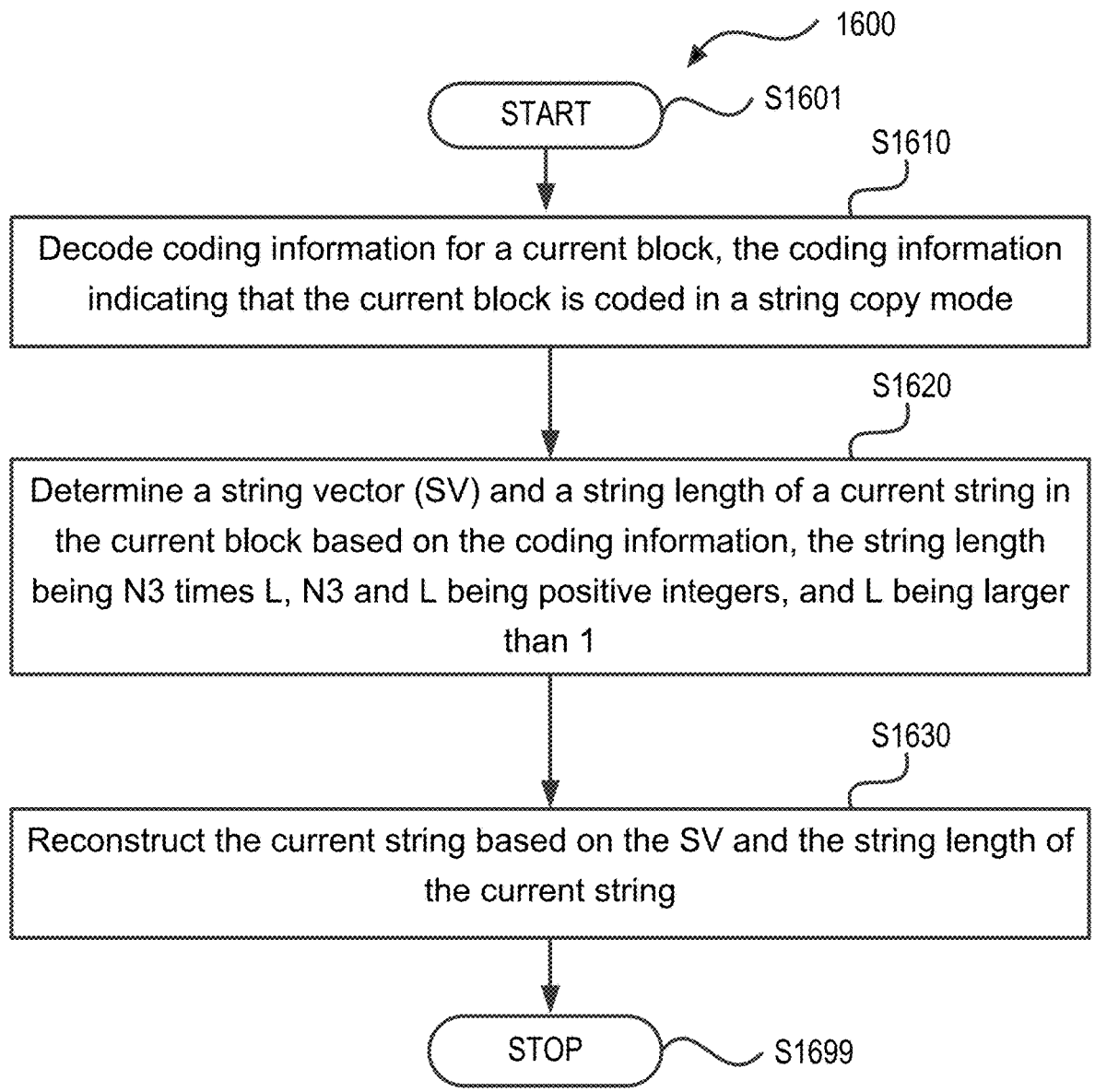
FIG. 16 shows a flow chart outlining a process (1600) according to an embodiment of the disclosure.

FIG. 16 shows a flow chart outlining a process (1600) according to an embodiment of the disclosure. The process (1600) can be used to reconstruct a string in a current block in a picture of a coded video sequence. The process (1600) can also be used in the reconstruction of the current block to generate a prediction block for the current block under reconstruction. The term block in the disclosure may be interpreted as a prediction block, a CB, a CU, or the like. In various embodiments, the process (1600) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1600) is implemented in software instructions, thus when the processing circuitry executes the software instructions, the processing circuitry performs the process (1600). The process starts at (S1601) and proceeds to (S1610).

At (S1610), coding information for the current block can be decoded. The coding information can indicate that the current block is coded in the string copy mode. In an example, the current block includes one or more strings.

At (S1620), a SV and a string length of a current string in the current block can be determined based on the coding information. The current string can be one of the one or more strings. The string length can be one or a multiple of the positive integer L that is larger than 1, and thus the string length can be equal to N3 times L. As described above, N3 is a positive integer.

In an example, the current block is a luma block and L is 4.

In an example, the current block is a chroma block and a chroma subsampling format is 4:2:0. If the chroma block is coded jointly with a corresponding luma block, L is 2. If the chroma block is coded separately from the corresponding luma block, L is 4.

In an example, the current block further includes escape samples that are outside of the one or more strings. A number of the escape samples can be one or a multiple of L.

In an example, the coding information further includes a syntax element indicating the string length. A coded value of the syntax element is the string length divided by L. The coded value of the syntax element can be an integer in a range from 1 to (M1/L−1) where M1 is a number of samples in the current block. The string length can be determined to be the value of the syntax element multiplied by L.

At (S1630), the current string can be reconstructed based on the SV and the string length of the current string.

The process (1600) can be suitably adapted. Step(s) in the process (1600) can be modified and/or omitted. Additional step(s) can be added. Any suitable order of implementation can be used. For example, the coding information further includes a syntax element that indicates a resolution used for the SV. In an example, the syntax element has 1 bit indicating that the resolution for the SV is 1-pel or 4-pel. If the resolution for the SV is 4-pel, an intermediate SV can be determined from the coding information, and the SV can be determined to be the intermediate SV multiplied by 4.

In an example, the current block includes a plurality of strings. A last string length of a last string to be coded in the plurality of strings is not signaled. The last string length can be determined based on (i) the number of samples in the current block and (ii) one or more string lengths of one or more remaining strings in the plurality of strings. The coding information can include a flag indicating whether the current string is the last string.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 17 shows a computer system (1700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 17:
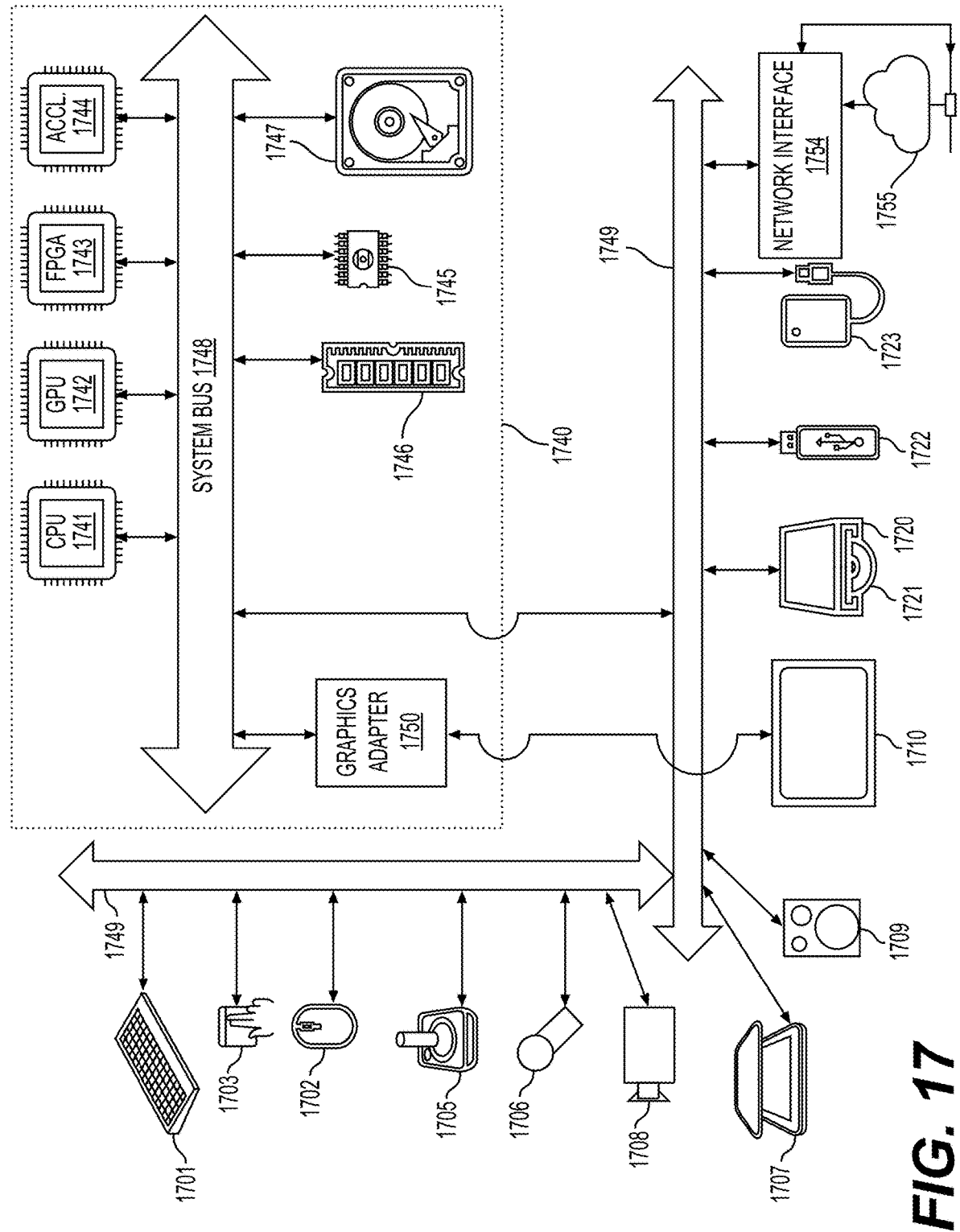
FIG. 17 is a schematic illustration of a computer system in accordance with an embodiment.

The components shown in FIG. 17 for computer system (1700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1700).

Computer system (1700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1701), mouse (1702), trackpad (1703), touch screen (1710), data-glove (not shown), joystick (1705), microphone (1706), scanner (1707), camera (1708).

Computer system (1700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1710), data-glove (not shown), or joystick (1705), but there can also be tactile feedback devices that do not serve as input devices), audio output devices (such as: speakers (1709), headphones (not depicted)), visual output devices (such as screens (1710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1700) can also include human accessible storage devices and their associated media such as optical media including CD/DVD ROM/RW (1720) with CD/DVD or the like media (1721), thumb-drive (1622), removable hard drive or solid state drive (1723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1700) can also include an interface (1754) to one or more communication networks (1755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1749) (such as, for example USB ports of the computer system (1700)); others are commonly integrated into the core of the computer system (1700) by attachment to a system bus as described below (for example Ethernet interface into a PC computer system or cellular network interface into a smartphone computer system). Using any of these networks, computer system (1700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1740) of the computer system (1700).

The core (1740) can include one or more Central Processing Units (CPU) (1741), Graphics Processing Units (GPU) (1742), specialized programmable processing units in the form of Field Programmable Gate Areas (FPGA) (1743), hardware accelerators for certain tasks (1744), graphics adapter (1750), and so forth. These devices, along with Read-only memory (ROM) (1745), Random-access memory (1746), internal mass storage such as internal non-user accessible hard drives, SSDs, and the like (1747), may be connected through a system bus (1748). In some computer systems, the system bus (1748) can be accessible in the form of one or more physical plugs to enable extensions by additional CPUs, GPU, and the like. The peripheral devices can be attached either directly to the core's system bus (1748), or through a peripheral bus (1749). In an example, a display (1710) can be connected to the graphics adapter (1750). Architectures for a peripheral bus include PCI, USB, and the like.

CPUs (1641), GPUs (1742), FPGAs (1743), and accelerators (1744) can execute certain instructions that, in combination, can make up the aforementioned computer code. That computer code can be stored in ROM (1745) or RAM (1746). Transitional data can be also be stored in RAM (1746), whereas permanent data can be stored for example, in the internal mass storage (1747). Fast storage and retrieve to any of the memory devices can be enabled through the use of cache memory, that can be closely associated with one or more CPU (1741), GPU (1742), mass storage (1747), ROM (1745), RAM (1746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1700), and specifically the core (1740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1740) that are of non-transitory nature, such as core-internal mass storage (1747) or ROM (1745). The software implementing various embodiments of the present disclosure can be stored in such devices and executed by core (1740). A computer-readable medium can include one or more memory devices or chips, according to particular needs. The software can cause the core (1740) and specifically the processors therein (including CPU, GPU, FPGA, and the like) to execute particular processes or particular parts of particular processes described herein, including defining data structures stored in RAM (1746) and modifying such data structures according to the processes defined by the software. In addition or as an alternative, the computer system can provide functionality as a result of logic hardwired or otherwise embodied in a circuit (for example: accelerator (1744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
MPM: most probable mode
WAIP: Wide-Angle Intra Prediction
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SDR: standard dynamic range
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
PDPC: Position Dependent Prediction Combination
ISP: Intra Sub-Partitions
SPS: Sequence Parameter Setting While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
    decoding coding information for a current block, the coding information indicating that the current block is coded in a string copy mode and the coding information including a first syntax element indicating a string length of a current string in the current block, the first syntax element having a value of N3, wherein the current block includes one or more strings including the current string and escape samples outside of the one or more strings;
    multiplying the value N3 of the first syntax element by a predefined multiple L to calculate the string length of the current string, wherein N3 and L are positive integers, a number M1 of samples in the current block is divisible by L, and a number of the escape samples is constrained to one or a multiple of L;
    determining a string vector (SV) and the string length of the current string in the current block based on the coding information; and
    reconstructing the current string based on the SV and the string length of the current string.

2. The method of claim 1, wherein the current block is a luma block and L is 4.

3. The method of claim 1, wherein:
    the current block is a chroma block;
    a chroma subsampling format is 4:2:0 indicating that the chroma block has half a height and half a width of a corresponding luma block; and
    L is 2 based on the chroma block being coded jointly with the corresponding luma block.

4. The method of claim 1, wherein:
    the current block is a chroma block;
    a chroma subsampling format is 4:2:0 indicating that the chroma block has half a height and half a width of a corresponding luma block; and
    L is 4 based on the chroma block being coded separately from the corresponding luma block.

5. The method of claim 1, wherein the number of the escape samples in a same row of the current block is constrained to one or a multiple of L.

6. The method of claim 1, wherein:
    the value of the first syntax element is an integer in a range from 1 to (M1/L-1).

7. The method of claim 1, wherein:
    the decoding the coding information further includes decoding the first syntax element.

8. The method of claim 1, wherein:
    the decoding the coding information further includes decoding a second syntax element that indicates a resolution used for the SV.

9. The method of claim 8, wherein:
    the second syntax element has 1 bit indicating that the resolution for the SV is one of (i) 1-sample and (ii) 4-sample; and
    based on the resolution for the SV being 4-sample, the determining the SV further includes:
    determining an intermediate SV from the coding information; and
    determining the SV to be the intermediate SV multiplied by 4.

10. The method of claim 1, wherein the current block includes a plurality of strings that includes the current string and a last string length of a last string that is to be coded in the plurality of strings is not signaled.

11. The method of claim 10, wherein the last string length is determined based on (i) a number of samples in the current block and (ii) one or more string lengths of one or more remaining strings in the plurality of strings.

12. The method of claim 10, wherein:
    the coding information includes a flag indicating whether the current string is the last string.

13. An apparatus for video encoding, comprising:
    processing circuitry configured to:
        determine a string vector (SV) and a string length of a current string in a current block, wherein the current block includes one or more strings including the current string and escape samples outside of the one or more strings;
        calculating a value N3 of a first syntax element indicating the string length of the current string by dividing the string length by a predefined multiple L, wherein N3 and L are positive integers, a number M1 of samples in the current block is divisible by L, and a number of the escape samples is constrained to one or a multiple of L; and
        generate a bitstream including coding information for the current block, the coding information indicating that the current block is coded in a string copy mode and including the first syntax element.

14. The apparatus of claim 13, wherein the current block is a luma block and L is 4.

15. The apparatus of claim 13, wherein:
    the current block is a chroma block;
    a chroma subsampling format is 4:2:0 indicating that the chroma block has half a height and half a width of a corresponding luma block; and
    L is 2 based on the chroma block being coded jointly with the corresponding luma block.

16. The apparatus of claim 13, wherein:
    the current block is a chroma block;
    a chroma subsampling format is 4:2:0 indicating that the chroma block has half a height and half a width of a corresponding luma block; and
    L is 4 based on the chroma block being coded separately from the corresponding luma block.

17. The apparatus of claim 13, wherein the number of the escape samples in a same row of the current block is constrained to one or a multiple of L.

18. A method of processing visual media data, the method comprising:

processing a bitstream that includes visual media data according to a format rule, wherein the bitstream includes coding information of a current block, the coding information indicating that the current block is coded in a string copy mode and the coding information including a first syntax element indicating a string length of a current string in the current block, wherein the current block includes one or more strings including the current string and escape samples outside of the one or more strings, the format rule specifies that a value N3 of the first syntax element is multiplied by a predefined multiple L to calculate the string length of the current string, wherein N3 and L are positive integers, a number M1 of samples in the current block is divisible by L, and a number of the escape samples is constrained to one or a multiple of L; and the format rule specifies that the current string is coded based on the string length of the current string.

* * * * *